US010164901B2

(12) United States Patent
Gomatam et al.

(10) Patent No.: US 10,164,901 B2
(45) Date of Patent: Dec. 25, 2018

(54) INTELLIGENT DATA CENTER SELECTION

(71) Applicant: Oracle International Corporation, Redwood Shores, CA (US)

(72) Inventors: Anand Mandayam Gomatam, Bangalore (IN); Praneet Tiwari, Bangalore (IN); Kunal Shrivastava, Darbhanga (IN); Karthic Viswanathan, Vellore (IN); Soumitra Kumar Gupta, Kanpur (IN); Tejkumar Arora, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 402 days.

(21) Appl. No.: 14/833,985

(22) Filed: Aug. 24, 2015

(65) Prior Publication Data
US 2016/0057077 A1 Feb. 25, 2016

Related U.S. Application Data

(60) Provisional application No. 62/040,779, filed on Aug. 22, 2014.

(51) Int. Cl.
*H04L 12/911* (2013.01)
*H04L 12/24* (2006.01)
(52) U.S. Cl.
CPC ........ *H04L 47/788* (2013.01); *H04L 41/5051* (2013.01)
(58) Field of Classification Search
CPC ........................ H04L 41/5051; H04L 47/788
(Continued)

(56) References Cited

U.S. PATENT DOCUMENTS 4,939,723 A 7/1990 Harley, Jr. et al.
5,892,909 A 4/1999 Grasso et al.
(Continued)

FOREIGN PATENT DOCUMENTS

CN 101256507 9/2008
CN 101710405 5/2010
(Continued)

OTHER PUBLICATIONS

Oracle Unveils Oracle Public Cloud Oracle, Oct. 5, 2011, 19 pages.
(Continued)

*Primary Examiner* — Davoud A Zand
(74) *Attorney, Agent, or Firm* — Kilpatrick Townsend & Stockton LLP

(57) ABSTRACT

In embodiments, a data center selection system can select a chosen data center (DC) for an order submitted to a cloud computing system using a preprocessing layer and a rules engine that incorporates action/algorithm-based selection using data center metrics to determine the chosen DC. In various embodiments, the data center selection system retrieves order information, objectives, rules, algorithms, and other data defined by an administrator. The data center selection system can then retrieve data center information aggregated from various data centers. Using order information received from an order management system, the data center selection system can utilizes the preprocessing layer, the rules engine, and the algorithm-based selection to select the chosen DC. The data center selection system can send an order request to the chosen DC in which to provision services for the order request.

10 Claims, 19 Drawing Sheets

US 10,164,901 B2

Page 2

(58) Field of Classification Search
USPC ............... 709/201, 202, 203, 223, 226, 248
See application file for complete search history.

(56) References Cited

U.S. PATENT DOCUMENTS

| | | | |
|---|---|---|---|
| 5,911,143 A | 6/1999 | Deinhart et al. |
| 5,961,636 A | 10/1999 | Brooks et al. |
| 5,970,120 A | 10/1999 | Kasrai |
| 6,052,684 A | 4/2000 | Du |
| 6,075,937 A | 6/2000 | Scalzi et al. |
| 6,122,640 A | 9/2000 | Pereira |
| 6,192,391 B1 | 2/2001 | Ohtani |
| 6,222,832 B1 | 4/2001 | Proctor |
| 6,397,125 B1 | 5/2002 | Goldring et al. |
| 6,546,095 B1 | 4/2003 | Iverson et al. |
| 6,611,506 B1 | 8/2003 | Huang et al. |
| 6,633,907 B1 | 10/2003 | Spencer et al. |
| 6,650,433 B1 | 11/2003 | Keane et al. |
| 6,745,209 B2 | 6/2004 | Holenstein et al. |
| 6,895,471 B1 | 5/2005 | Tse et al. |
| 6,934,727 B2 | 8/2005 | Berkowitz et al. |
| 6,965,899 B1* | 11/2005 | Subramaniam ... G06F 17/30339 |
| 6,970,889 B2 | 11/2005 | Flanagin et al. |
| 6,976,798 B2 | 12/2005 | Keane et al. |
| 7,321,904 B2 | 1/2008 | Holenstein et al. |
| 7,363,332 B2 | 4/2008 | Berkowitz et al. |
| 7,383,355 B1 | 6/2008 | Berkman et al. |
| 7,409,413 B2 | 8/2008 | Martinez et al. |
| 7,428,503 B1 | 9/2008 | Groff et al. |
| 7,565,310 B2 | 7/2009 | Gao et al. |
| 7,610,585 B2 | 10/2009 | Shpeisman et al. |
| 7,617,317 B2 | 11/2009 | Jones et al. |
| 7,698,398 B1 | 4/2010 | Lai |
| 7,711,780 B1* | 5/2010 | Durand ................ H04L 45/306 |
| | | | 709/206 |
| 7,783,746 B2 | 8/2010 | Hand et al. |
| 7,788,225 B2 | 8/2010 | Fish et al. |
| 7,790,393 B2 | 9/2010 | Lyamichev et al. |
| 7,912,930 B1 | 3/2011 | Farooqi et al. |
| 7,921,299 B1 | 4/2011 | Anantha et al. |
| 7,974,943 B2 | 7/2011 | Gilbert et al. |
| 8,156,083 B2 | 4/2012 | Banerjee et al. |
| 8,165,152 B2 | 4/2012 | Sammour et al. |
| 8,204,794 B1 | 6/2012 | Peng et al. |
| 8,254,396 B2 | 8/2012 | Appanna et al. |
| 8,291,490 B1 | 10/2012 | Ahmed et al. |
| 8,321,921 B1 | 11/2012 | Ahmed et al. |
| 8,332,358 B2 | 12/2012 | Kaiser |
| 8,370,303 B1 | 2/2013 | Ceschim et al. |
| 8,380,880 B2 | 2/2013 | Gulley et al. |
| 8,468,244 B2 | 6/2013 | Redlich et al. |
| 8,499,005 B2 | 7/2013 | Brooks et al. |
| 8,515,907 B2 | 8/2013 | Burjoski |
| 8,572,027 B2 | 10/2013 | Parees et al. |
| 8,572,602 B1 | 10/2013 | Colton et al. |
| 8,626,717 B2 | 1/2014 | Bendakovsky et al. |
| 8,656,002 B1 | 2/2014 | Adogla et al. |
| 8,712,961 B2 | 4/2014 | Dwyer et al. |
| 8,738,775 B1 | 5/2014 | Adogla et al. |
| 8,788,457 B2 | 7/2014 | Parees et al. |
| 8,788,663 B1 | 7/2014 | Adogla et al. |
| 8,806,593 B1 | 8/2014 | Raphel et al. |
| 8,849,685 B2 | 9/2014 | Oden |
| 8,949,178 B2 | 2/2015 | Zhao et al. |
| 8,972,725 B2 | 3/2015 | Arun et al. |
| 9,015,114 B2 | 4/2015 | Chatterjee et al. |
| 9,137,209 B1 | 9/2015 | Brandwine et al. |
| 9,203,866 B2 | 12/2015 | Chatterjee et al. |
| 9,244,953 B2 | 1/2016 | Vingralek et al. |
| 9,253,113 B2 | 2/2016 | Vasudevan et al. |
| 9,319,269 B2 | 4/2016 | Arun et al. |
| 9,336,030 B1 | 5/2016 | Marr et al. |
| 9,336,483 B1 | 5/2016 | Abeysooriya et al. |
| 9,397,884 B2 | 7/2016 | Chatterjee et al. |
| 9,535,754 B1 | 1/2017 | Suarez et al. |
| 9,619,540 B2 | 4/2017 | Prathipati et al. |
| 9,621,435 B2 | 4/2017 | Vasudevan et al. |
| 9,646,069 B2 | 5/2017 | Khalsa et al. |
| 9,667,470 B2 | 5/2017 | Prathipati et al. |
| 9,734,224 B2 | 8/2017 | Chatterjee et al. |
| 9,792,338 B2 | 10/2017 | Evans et al. |
| 9,838,370 B2 | 12/2017 | Doering et al. |
| 2002/0007363 A1 | 1/2002 | Vaitzblit et al. |
| 2002/0091863 A1 | 7/2002 | Schug |
| 2002/0156664 A1 | 10/2002 | Willcox et al. |
| 2003/0046342 A1 | 3/2003 | Felt et al. |
| 2003/0212991 A1 | 11/2003 | Mahajan |
| 2003/0233465 A1 | 12/2003 | Le et al. |
| 2004/0022379 A1 | 2/2004 | Klos et al. |
| 2004/0066930 A1 | 4/2004 | Bangor |
| 2004/0177133 A1 | 9/2004 | Harrison et al. |
| 2004/0267872 A1 | 12/2004 | Serdy, Jr. et al. |
| 2005/0071209 A1 | 3/2005 | Tatavu et al. |
| 2005/0198629 A1 | 9/2005 | Vishwanath |
| 2005/0289013 A1 | 12/2005 | Goldberg |
| 2005/0289072 A1 | 12/2005 | Sabharwal |
| 2006/0059029 A1 | 3/2006 | Chalasani et al. |
| 2006/0173724 A1 | 8/2006 | Trefler et al. |
| 2006/0265583 A1 | 11/2006 | Eilam et al. |
| 2007/0005536 A1 | 1/2007 | Caswell et al. |
| 2007/0028098 A1 | 2/2007 | Baartman et al. |
| 2007/0028288 A1 | 2/2007 | Sigmon, Jr. et al. |
| 2007/0043784 A1 | 2/2007 | Parkinson |
| 2007/0112952 A1 | 5/2007 | Sodhi et al. |
| 2007/0150480 A1 | 6/2007 | Hwang et al. |
| 2007/0174101 A1 | 7/2007 | Li et al. |
| 2007/0203798 A1 | 8/2007 | Caballero et al. |
| 2007/0215683 A1 | 9/2007 | Koorland et al. |
| 2007/0220140 A1 | 9/2007 | Weidenschlager |
| 2007/0283147 A1 | 12/2007 | Fried et al. |
| 2008/0027825 A1 | 1/2008 | Boonie et al. |
| 2008/0059469 A1 | 3/2008 | Pruet |
| 2008/0077680 A1 | 3/2008 | Dellarole et al. |
| 2008/0089520 A1 | 4/2008 | Kessler |
| 2008/0097816 A1 | 4/2008 | Freire et al. |
| 2008/0127183 A1 | 5/2008 | Emerson et al. |
| 2008/0256419 A1 | 10/2008 | Wojewoda et al. |
| 2008/0256606 A1 | 10/2008 | Koikara et al. |
| 2008/0270597 A1 | 10/2008 | Tenenti |
| 2008/0281617 A1 | 11/2008 | Conrad et al. |
| 2009/0063580 A1 | 3/2009 | Allen et al. |
| 2009/0157457 A1 | 6/2009 | Huuhtanen et al. |
| 2009/0198797 A1 | 8/2009 | Wang et al. |
| 2009/0254572 A1 | 10/2009 | Redlich et al. |
| 2009/0265753 A1 | 10/2009 | Anderson et al. |
| 2009/0276771 A1* | 11/2009 | Nickolov ............. G06F 9/4856 |
| | | | 717/177 |
| 2009/0300604 A1 | 12/2009 | Barringer |
| 2010/0161552 A1 | 6/2010 | Murarasu et al. |
| 2010/0198730 A1 | 8/2010 | Ahmed et al. |
| 2010/0205152 A1 | 8/2010 | Ansari et al. |
| 2010/0211781 A1 | 8/2010 | Auradkar et al. |
| 2010/0248681 A1 | 9/2010 | Phills |
| 2010/0251242 A1 | 9/2010 | Sivasubramanian et al. |
| 2010/0251339 A1 | 9/2010 | Mcalister |
| 2010/0269049 A1 | 10/2010 | Fearon |
| 2010/0280958 A1 | 11/2010 | Hasson et al. |
| 2010/0318393 A1 | 12/2010 | Acker et al. |
| 2010/0332629 A1 | 12/2010 | Cotugno et al. |
| 2011/0029983 A1 | 2/2011 | Lu et al. |
| 2011/0072436 A1 | 3/2011 | Gilat et al. |
| 2011/0103566 A1 | 5/2011 | Sarkar et al. |
| 2011/0131309 A1 | 6/2011 | Akiyama et al. |
| 2011/0137805 A1 | 6/2011 | Brookbanks et al. |
| 2011/0138051 A1 | 6/2011 | Dawson et al. |
| 2011/0153969 A1 | 6/2011 | Petrick |
| 2011/0211686 A1 | 9/2011 | Wall et al. |
| 2011/0218813 A1 | 9/2011 | Addala et al. |
| 2011/0218842 A1 | 9/2011 | Addala et al. |
| 2011/0218924 A1 | 9/2011 | Addala et al. |
| 2011/0218925 A1 | 9/2011 | Addala et al. |
| 2011/0219218 A1 | 9/2011 | Addala et al. |
| 2011/0225081 A1 | 9/2011 | Kittelsen et al. |
| 2011/0231280 A1 | 9/2011 | Farah |

(56) References Cited

U.S. PATENT DOCUMENTS

| | | |
|---|---|---|
| 2011/0238458 A1 | 9/2011 | Purcell et al. |
| 2011/0238737 A1 | 9/2011 | Agrawal et al. |
| 2011/0276951 A1 | 11/2011 | Jain |
| 2011/0288968 A1 | 11/2011 | King et al. |
| 2011/0295998 A1 | 12/2011 | Ferris et al. |
| 2011/0296000 A1 | 12/2011 | Ferris et al. |
| 2011/0307523 A1 | 12/2011 | Balani et al. |
| 2011/0313902 A1 | 12/2011 | Liu et al. |
| 2011/0314466 A1 | 12/2011 | Berg et al. |
| 2012/0005341 A1 | 1/2012 | Seago et al. |
| 2012/0032945 A1 | 2/2012 | Dare et al. |
| 2012/0036220 A1 | 2/2012 | Dare et al. |
| 2012/0036245 A1 | 2/2012 | Dare et al. |
| 2012/0036440 A1 | 2/2012 | Dare et al. |
| 2012/0036442 A1 | 2/2012 | Dare et al. |
| 2012/0036552 A1 | 2/2012 | Dare et al. |
| 2012/0045854 A1 | 2/2012 | Matsuoka et al. |
| 2012/0047357 A1 | 2/2012 | Bealkowski |
| 2012/0054624 A1 | 3/2012 | Owens, Jr. et al. |
| 2012/0066755 A1 | 3/2012 | Peddada et al. |
| 2012/0072555 A1 | 3/2012 | DeLuca et al. |
| 2012/0084351 A1 | 4/2012 | Yato et al. |
| 2012/0089426 A1 | 4/2012 | Borucki |
| 2012/0096521 A1 | 4/2012 | Peddada |
| 2012/0110583 A1 | 5/2012 | Balko et al. |
| 2012/0131166 A1 | 5/2012 | Barbedette et al. |
| 2012/0131194 A1 | 5/2012 | Morgan |
| 2012/0136936 A1 | 5/2012 | Quintuna |
| 2012/0150693 A1 | 6/2012 | Dueck et al. |
| 2012/0159494 A1 | 6/2012 | Shafiee et al. |
| 2012/0159503 A1 | 6/2012 | Shafiee et al. |
| 2012/0221454 A1 | 8/2012 | Morgan |
| 2012/0226796 A1 | 9/2012 | Morgan |
| 2012/0226808 A1 | 9/2012 | Morgan |
| 2012/0233309 A1 | 9/2012 | Rossignoli |
| 2012/0271949 A1 | 10/2012 | Radhakrishnan et al. |
| 2012/0284158 A1 | 11/2012 | Kovac |
| 2012/0284776 A1 | 11/2012 | Sundaram et al. |
| 2012/0297441 A1 | 11/2012 | Boldyrev et al. |
| 2012/0304191 A1 | 11/2012 | Morgan |
| 2012/0311153 A1 | 12/2012 | Morgan |
| 2012/0311154 A1 | 12/2012 | Morgan |
| 2012/0324092 A1 | 12/2012 | Brown et al. |
| 2013/0030859 A1 | 1/2013 | Jung et al. |
| 2013/0042005 A1 | 2/2013 | Boss et al. |
| 2013/0054763 A1 | 2/2013 | Van Der Merwe et al. |
| 2013/0080480 A1 | 3/2013 | Mao et al. |
| 2013/0086269 A1 | 4/2013 | Bairavasundaram et al. |
| 2013/0103640 A1 | 4/2013 | Rehman |
| 2013/0117157 A1 | 5/2013 | Iyoob et al. |
| 2013/0124401 A1 | 5/2013 | Del Real |
| 2013/0145300 A1 | 6/2013 | MacKay et al. |
| 2013/0152183 A1 | 6/2013 | Plewnia et al. |
| 2013/0191531 A1* | 7/2013 | Kruglick ............ H04L 41/5038 709/224 |
| 2013/0212420 A1 | 8/2013 | Lawson et al. |
| 2013/0254882 A1 | 9/2013 | Kannappan et al. |
| 2013/0262382 A1* | 10/2013 | Kruglick ........... G06F 17/30079 707/634 |
| 2013/0262556 A1 | 10/2013 | Xu et al. |
| 2013/0268480 A1 | 10/2013 | Dorman |
| 2013/0268491 A1 | 10/2013 | Chung et al. |
| 2013/0275509 A1 | 10/2013 | Micucci et al. |
| 2013/0283350 A1 | 10/2013 | Afek et al. |
| 2013/0298210 A1 | 11/2013 | Wright et al. |
| 2013/0305311 A1* | 11/2013 | Puttaswamy Naga ...................... H04L 63/20 726/1 |
| 2013/0336235 A1 | 12/2013 | Meyer et al. |
| 2014/0006815 A1* | 1/2014 | Castro-Leon ........... G06F 1/266 713/310 |
| 2014/0059002 A1 | 2/2014 | Lockhart et al. |
| 2014/0074540 A1 | 3/2014 | Evans et al. |
| 2014/0074544 A1 | 3/2014 | Seetharam et al. |
| 2014/0074659 A1 | 3/2014 | Chatterjee et al. |
| 2014/0074788 A1 | 3/2014 | Chatterjee et al. |
| 2014/0075016 A1 | 3/2014 | Chatterjee et al. |
| 2014/0075027 A1 | 3/2014 | Chatterjee et al. |
| 2014/0075032 A1 | 3/2014 | Vasudevan et al. |
| 2014/0075034 A1 | 3/2014 | Vasudevan et al. |
| 2014/0075239 A1 | 3/2014 | Prathipati et al. |
| 2014/0075499 A1 | 3/2014 | Arun et al. |
| 2014/0082749 A1 | 3/2014 | Holland et al. |
| 2014/0141743 A1 | 5/2014 | Shaw |
| 2014/0143083 A1 | 5/2014 | Prathipati et al. |
| 2014/0192717 A1 | 7/2014 | Liu et al. |
| 2014/0201345 A1 | 7/2014 | Abuelsaad et al. |
| 2014/0237502 A1 | 8/2014 | Kelsen et al. |
| 2014/0372533 A1 | 12/2014 | Fu et al. |
| 2015/0067171 A1 | 3/2015 | Yum et al. |
| 2015/0089614 A1* | 3/2015 | Mathew ................ H04L 67/141 726/7 |
| 2015/0156218 A1 | 6/2015 | Arun et al. |
| 2015/0180736 A1* | 6/2015 | Leung ................. H04L 41/5054 709/226 |
| 2015/0186408 A1 | 7/2015 | Shao et al. |
| 2015/0254286 A1 | 9/2015 | Dutta et al. |
| 2015/0281316 A1 | 10/2015 | Bragstad et al. |
| 2016/0070772 A1 | 3/2016 | Chatterjee et al. |
| 2016/0105372 A1 | 4/2016 | Vasudevan et al. |
| 2016/0197835 A1* | 7/2016 | Luft ........................ H04L 12/46 709/223 |
| 2016/0217403 A1* | 7/2016 | Gupte ............... G06F 17/30604 |
| 2016/0254957 A1* | 9/2016 | Maes ................ G06F 17/30557 709/223 |
| 2016/0254961 A1* | 9/2016 | Maes ................ G06F 17/30557 709/226 |
| 2016/0254965 A1* | 9/2016 | Maes ..................... H04L 67/10 709/223 |
| 2016/0380840 A1* | 12/2016 | Karve .................... H04L 41/20 709/223 |
| 2017/0230235 A1 | 8/2017 | Khalsa et al. |
| 2017/0244613 A1 | 8/2017 | Vasudevan et al. |
| 2017/0331668 A1 | 11/2017 | Prathipati et al. |

FOREIGN PATENT DOCUMENTS

| | | |
|---|---|---|
| CN | 102222090 | 10/2011 |
| CN | 102420873 | 4/2012 |
| CN | 104604201 | 5/2015 |
| CN | 104756460 | 7/2015 |
| EP | 0538464 | 4/1993 |
| EP | 1914951 | 4/2008 |
| EP | 2458548 | 5/2012 |
| EP | 2893684 | 7/2015 |
| EP | 2893685 | 7/2015 |
| EP | 2893685 | 7/2017 |
| JP | 2012079210 | 4/2012 |
| JP | 2012084129 | 4/2012 |
| JP | 2015529366 | 10/2015 |
| JP | 2015529367 | 10/2015 |
| WO | 2009018584 | 2/2009 |
| WO | 2010149222 | 12/2010 |
| WO | 2010151273 | 12/2010 |
| WO | 2012006638 | 1/2012 |
| WO | 2012047932 | 4/2012 |
| WO | 2012070993 | 5/2012 |
| WO | 2014039919 | 3/2014 |
| WO | 2014039921 | 3/2014 |

OTHER PUBLICATIONS

Oracle—Breaking Cloud Security Barriers with Identity Management Oracle, 2010, 37 pages.
Oracle Identity Management 11g—An Oracle Whitepaper, Jul. 2010, 61 pages.
Oracle Service Contracts, User Guide, Release 12, Oracle, Part No. B25717-02, Jun. 2007, 534 pages.
The Oracle Identity Management Platform: Identity Services at Internet Scale, Oracle, Jul. 2012, 20 pages.

(56) References Cited

OTHER PUBLICATIONS

Afgan et al., CloudMan as a Tool Execution Framework for the Cloud, MIPRO, 2012 Proceedings of the 35th, International Convention, IEEE, XP032201952, ISBN: 978-1-4673-2577-6, May 21, 2012, pp. 437-441.
Alcaraz Calero et al., Toward a Multi-Tenancy Authorization System for Cloud Services, IEEE Computer and Reliability Societies, Nov./Dec. 2010, pp. 48-55.
Bastos et al., Towards a Cloud-Based Environment for Space Systems Concept Design, Information Society (I-Society), International Conference On, IEEE, XP032224790, ISBN: 978-1-4673-0838-0, 2012, pp. 478-483.
Lau et al., Best Practices for access control in multi-tenant cloud solutions using Tivoli Access Manager, IBM, DeveloperWorks, May 1, 2011, 6 pages.
Paul et al., Architectures for the future networks and the next generation Internet: A survey, Computer Communications, Elsevier Science,Publishers BV, Amsterdam, NL,Department of Computer Science and Engineering, Washington University in Saint Louis. United States, XP027476826, ISSN: 0140-3664, DOI: 10.1016/J.COMCOM.2010.08.001[retrieved on 2010, Jan. 15, 2011, pp. 2-42.
Rasheed et al., Multi-Tenancy on Private Cloud Enlighten, Feb. 2012, 20 pages.
Tsai et al., Role-Based Access Control Using Reference Ontology in Clouds, IEEE, 2011 Tenth International Symposium on Autonomous Decentralized Systems, 2011, pp. 121-128.
Wainwright, Oracle Public Cloud—An Enterprise Cloud for Business Critical Applications, Oracle, 2011, 39 pages.
European Application No. 13766777.0, Office Action dated Feb. 10, 2016, 5 pages.
European Application No. 13766777.0, Office Action dated Nov. 30, 2016, 5 pages.
International Application No. PCT/US2013/058639, International Preliminary Report on Patentability dated Sep. 24, 2015, 8 pages.
International Application No. PCT/US2013/058639, International Search Report and Written Opinion dated Jan. 8, 2014, 10 pages.
International Application No. PCT/US2013/058639, Written Opinion dated Jul. 7, 2015, 6 pages.
International Application No. PCT/US2013/058642, International Preliminary Report on Patentability dated Jan. 20, 2015, 10 pages.
International Application No. PCT/US2013/058642, International Search Report and Written Opinion dated Feb. 7, 2014, 17 pages.
International Application No. PCT/US2013/058642, Invitation to Pay Add'l Fees dated Dec. 5, 2013, 5 .pages.
International Application No. PCT/US2013/058642, Invitation to restrict or pay additional fees dated Jul. 23, 2014, 3 pages.
International Application No. PCT/US2013/058642, Written Opinion dated Sep. 11, 2014, 8 pages.
U.S. Appl. No. 13/840,943, Non-Final Office Action dated Dec. 18, 2014, 10 pages.
U.S. Appl. No. 13/840,943, Notice of Allowance dated Jun. 29, 2015, 10 pages.
U.S. Appl. No. 13/841,243, Non-Final Office Action dated Jul. 15, 2015, 15 pages.
U.S. Appl. No. 13/841,243, Notice of Allowance dated Mar. 22, 2016, 8 pages.
U.S. Appl. No. 13/841,243, Supplemental Notice of Allowability dated May 13, 2016, 2 pages.
U.S. Appl. No. 13/841,768, Final Office Action dated Jun. 17, 2016, 13 pages.
U.S. Appl. No. 13/841,768, Non-Final Office Action dated Oct. 6, 2015, 11 pages.
U.S. Appl. No. 13/841,994, Final Office Action dated May 19, 2016, 10 pages.
U.S. Appl. No. 13/841,994, Non-Final Office Action dated Oct. 26, 2015, 8 pages.
U.S. Appl. No. 13/841,994, Notice of Allowance dated Dec. 5, 2016, 5 pages.
U.S. Appl. No. 13/842,269, Non-Final Office Action dated Jun. 5, 2014, 12 pages.
U.S. Appl. No. 13/842,269, Notice of Allowance dated Nov. 3, 2014, 8 pages.
U.S. Appl. No. 13/842,269, Supplemental Notice of Allowability dated Feb. 3, 2015, 2 pages.
U.S. Appl. No. 13/842,833, Corrected Notice of Allowability dated Mar. 30, 2015, 2 pages.
U.S. Appl. No. 13/842,833, Notice of Allowance dated Dec. 15, 2014, 11 pages.
U.S. Appl. No. 13/843,613, Final Office Action dated Jun. 2, 2015, 20 pages.
U.S. Appl. No. 13/843,613, Non-Final Office Action dated Mar. 21, 2016, 12 pages.
U.S. Appl. No. 13/843,613, Non-Final Office Action dated Jan. 23, 2015, 17 pages.
U.S. Appl. No. 13/906,835, Final Office Action dated Aug. 7, 2015, 21 pages.
U.S. Appl. No. 13/906,835, Non-Final Office Action dated Apr. 13, 2016, 14 pages.
U.S. Appl. No. 13/906,835, Non-Final Office Action dated Mar. 20, 2015, 16 pages.
U.S. Appl. No. 13/907,616, Final Office Action dated Jun. 28, 2016, 9 pages.
U.S. Appl. No. 13/907,616, Non-Final Office Action dated Dec. 4, 2015, 9 pages.
U.S. Appl. No. 13/907,616, Notice of Allowance dated Nov. 14, 2016, 11 pages.
U.S. Appl. No. 13/907,652, Final Office Action dated Dec. 17, 2015, 10 pages.
U.S. Appl. No. 13/907,652, Final Office Action dated Sep. 13, 2016, 14 pages.
U.S. Appl. No. 13/907,652, Non-Final Office Action dated Jun. 3, 2015, 10 pages.
U.S. Appl. No. 13/907,652, Non-Final Office Action dated Feb. 19, 2016, 11 pages.
U.S. Appl. No. 13/907,652, Notice of Allowance dated Jan. 25, 2017, 7 pages.
U.S. Appl. No. 13/909,795, Non-Final Office Action dated Apr. 23, 2015, 9 pages.
U.S. Appl. No. 13/909,795, Notice of Allowance dated Sep. 18, 2015, 5 pages.
U.S. Appl. No. 14/618,791, Non-Final Office Action dated Sep. 4, 2015, 17 pages.
U.S. Appl. No. 14/618,791, Notice of Allowance dated Dec. 21, 2015, 7 pages.
U.S. Appl. No. 14/618,791, Supplemental Notice of Allowability dated Jan. 6, 2016, 2 pages.
U.S. Appl. No. 14/618,791, Supplemental Notice of Allowability dated Mar. 14, 2016, 2 pages.
U.S. Appl. No. 14/618,791, Non-Final Office Action dated Nov. 3, 2016, 18 pages.
U.S. Appl. No. 14/664,528, Non-Final Office Action dated May 9, 2016, 19 pages.
U.S. Appl. No. 13/841,994, Notice of Allowability dated Dec. 30, 2016, 2 pages.
U.S. Appl. No. 13/907,616, Notice of Allowability dated Dec. 30, 2016, 3 pages.
U.S. Appl. No. 13/907,616, Notice of Allowability dated Jan. 4, 2017, 3 pages.
U.S. Appl. No. 13/907,616, Supplemental Notice of Allowability dated Feb. 16, 2017, 3 pages.
U.S. Appl. No. 13/907,652, Notice of Allowance dated Apr. 20, 2017, 2 pages.
U.S. Appl. No. 14/664,528, Notice of Allowance dated May 17, 2017, 10 pages.
Chinese Application No. 201380046472.4, Office Action dated Feb. 20, 2017, 25 pages (10 pages for the original document and 15 pages for the English translation).
Chinese Application No. 201380054681.3, Office Action dated Mar. 31, 2017, 38 pages (25 pages for the original document and 13 pages for the English translation).
U.S. Appl. No. 13/843,613, Notice of Allowance dated Jun. 9, 2017, 9 pages.

(56) References Cited

OTHER PUBLICATIONS

U.S. Appl. No. 15/445,617, Non-Final Office Action dated Jul. 28, 2017, 13 pages.
U.S. Appl. No. 13/840,943, filed Mar. 15, 2013, now U.S. Pat. No. 9,203,866 issued on Dec. 1, 2015.
U.S. Appl. No. 13/841,243, filed Mar. 15, 2013, now U.S. Pat. No. 9,397,884 issued on Jul. 19, 2016.
U.S. Appl. No. 13/841,768, filed Mar. 15, 2013.
U.S. Appl. No. 13/841,994 filed Mar. 15, 2013.
U.S. Appl. No. 13/842,269 filed Mar. 15, 2013 now U.S. Pat. No. 8,972,725 issued on Mar. 3, 2015.
U.S. Appl. No. 13/842,833, filed Mar. 15, 2013 now U.S. Pat. No. 9,015,114 issued on Apr. 21, 2015.
U.S. Appl. No. 13/843,613, filed Mar. 15, 2013.
U.S. Appl. No. 13/906,835, filed May 31, 2013.
U.S. Appl. No. 13/907,616, filed May 31, 2013.
U.S. Appl. No. 13/907,652, filed May 31, 2013.
U.S. Appl. No. 13/909,795, filed Jun. 4, 2013.
U.S. Appl. No. 14/618,791, filed Feb. 10, 2015, now U.S. Pat. No. 9,319,269 issued on Apr. 19, 2016.
U.S. Appl. No. 14/664,528, filed Mar. 20, 2015.
U.S. Appl. No. 15/495,749, Non-Final Office Action dated Sep. 25, 2017, 7 pages.
Chinese Application No. 201380054681.3, Office Action dated Nov. 16, 2017, 33 pages. (12 pages of English translation and 21 pages of original document).
Chinese Application No. 201380054825.5, Office Action dated Sep. 30, 2017, 9 pages. (6 pages of English translation and 3 pages of original document).
Fukuda, Optimum Solution to Development of Smartphone App / Speedup with Basic Development Environment, Nikkei Computer, Nikkei Business Publications, Inc., No. 814, Aug. 2, 2012, pp. 42-47.
JP2015-531268, Office Action dated Sep. 26, 2017, 4 pages.
JP2015-531269, Office Action dated Nov. 7, 2017, 4 pages.
U.S. Appl. No. 15/246,352, Notice of Allowance dated Jul. 25, 2018, 22 pages.
U.S. Appl. No. 15/246,352, First Action Interview Pilot Program Pre-Interview Communication dated Jun. 11, 2018, 4 pages.
U.S. Appl. No. 14/975,318, Non-Final Office Action dated May 18, 2018, 13 pages.
U.S. Appl. No. 15/445,617, Non-Final Office Action dated Feb. 8, 2018, 12 pages.
U.S. Appl. No. 14/624,356, Non-Final Office Action dated Feb. 22, 2018, 12 pages.
U.S. Appl. No. 14/624,356, Notice of Allowance dated Jul. 18, 2018, 14 pages.
U.S. Appl. No. 15/495,749, Notice of Allowance dated Feb. 28, 2018, 7 pages.
Chinese Application No. CN201380054825.5, Office Action dated Feb. 13, 2018, 7 pages.
European Application No. EP15708964.0, Office Action, dated Jan. 26, 2018, 6 pages.
Japanese Application No. 2015-531269, Office Action dated Jul. 3, 2018, 6 pages (5 pages for the original document and 1 page for the English translation).

\* cited by examiner

INTELLIGENT DATA CENTER SELECTION

CROSS-REFERENCES TO RELATED APPLICATIONS

This Applications claims priority to and the benefit of U.S. Provisional Patent Application No. 62/040,779, filed Aug. 22, 2014 and entitled "INTELLIGENT DATA CENTER SELECTION," which is hereby incorporate by reference for all purposes.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor-intensive process.

Consumers and businesses have an expectation that ordering and starting the use of computer network cloud-based services be seamless. However, many cloud services are difficult to start up, requiring the provisioning of resources that might be shared. For example, servers in a server farm may run cloud services for many customers at once, and adding another customer may require shifting around resources. Different users may wish to employ different services. For example, some users may only want raw storage on the cloud, while other users may want to use sophisticated database storage. Still others may want the use of graphical user interface (GUI) software applications running on the cloud for its employees or customers.

There exists a need in the art for faster, less expensive, and easier-to-use cloud based computer systems.

SUMMARY

Generally, aspects of the present disclosure relate to enabling already provisioned services, such as database services and Java® services, in a computer network cloud infrastructure system to be reused in order to reduce the time to provision new services.

In embodiments, a data center selection system can select a chosen data center (DC) for an order submitted to a cloud computing system using a preprocessing layer and a rules engine that incorporates action/algorithm-based selection using data center metrics to determine the chosen DC. In various embodiments, the data center selection system retrieves order information, objectives, rules, algorithms, and other data defined by an administrator. The data center selection system can then retrieve data center information aggregated from various data centers. Using order information received from an order management system, the data center selection system can utilizes the preprocessing layer, the rules engine, and the algorithm-based selection to select the chosen DC. The data center selection system can send an order request to the chosen DC in which to provision services for the order request.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

Illustrative embodiments of the present invention are described in detail below with reference to the following drawing figures.

DETAILED DESCRIPTION

Figure 1A:
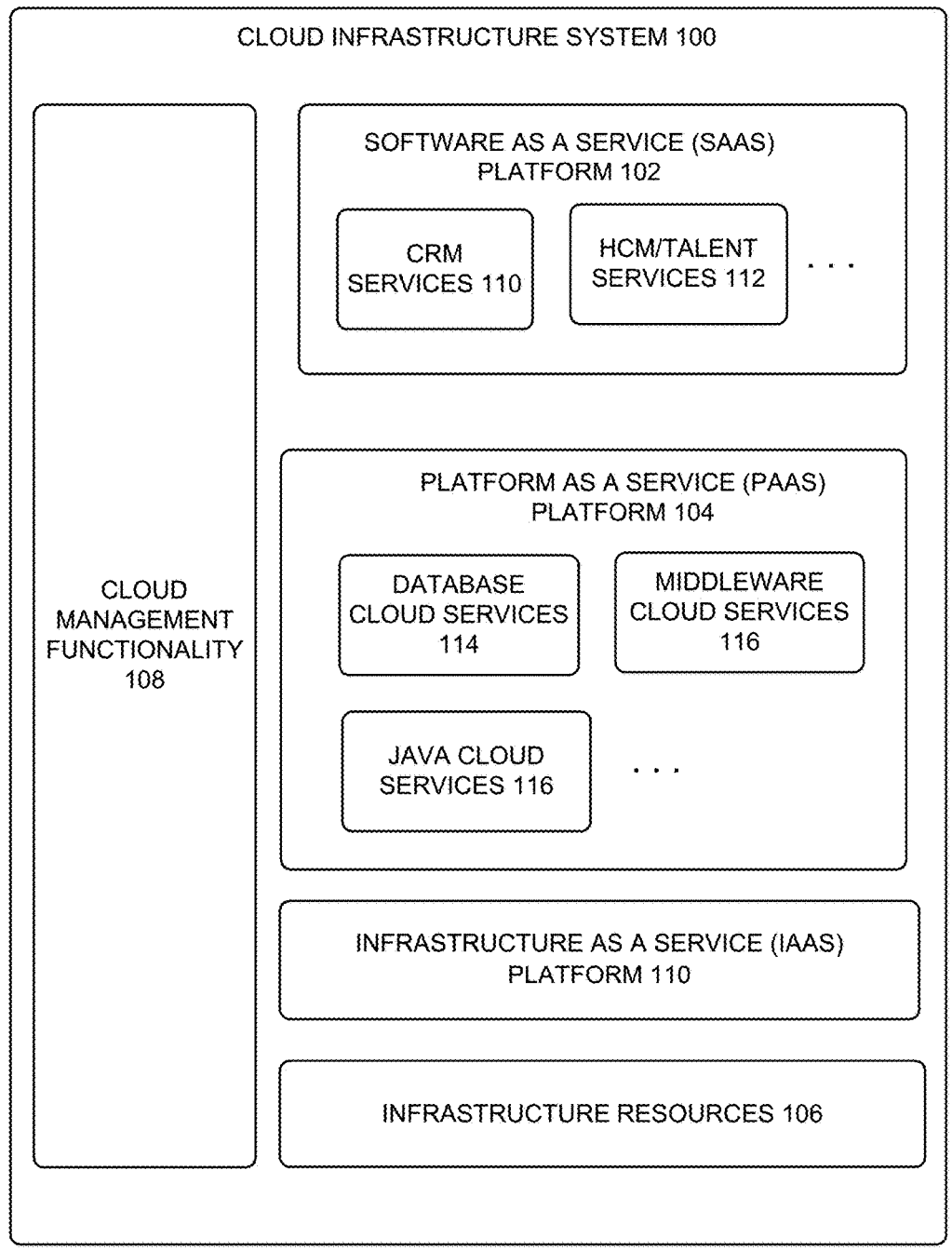
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

Introduction

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration, and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing, and tracking a customer's subscription received by the cloud infrastructure system 100, and the like.

Figure 1B:
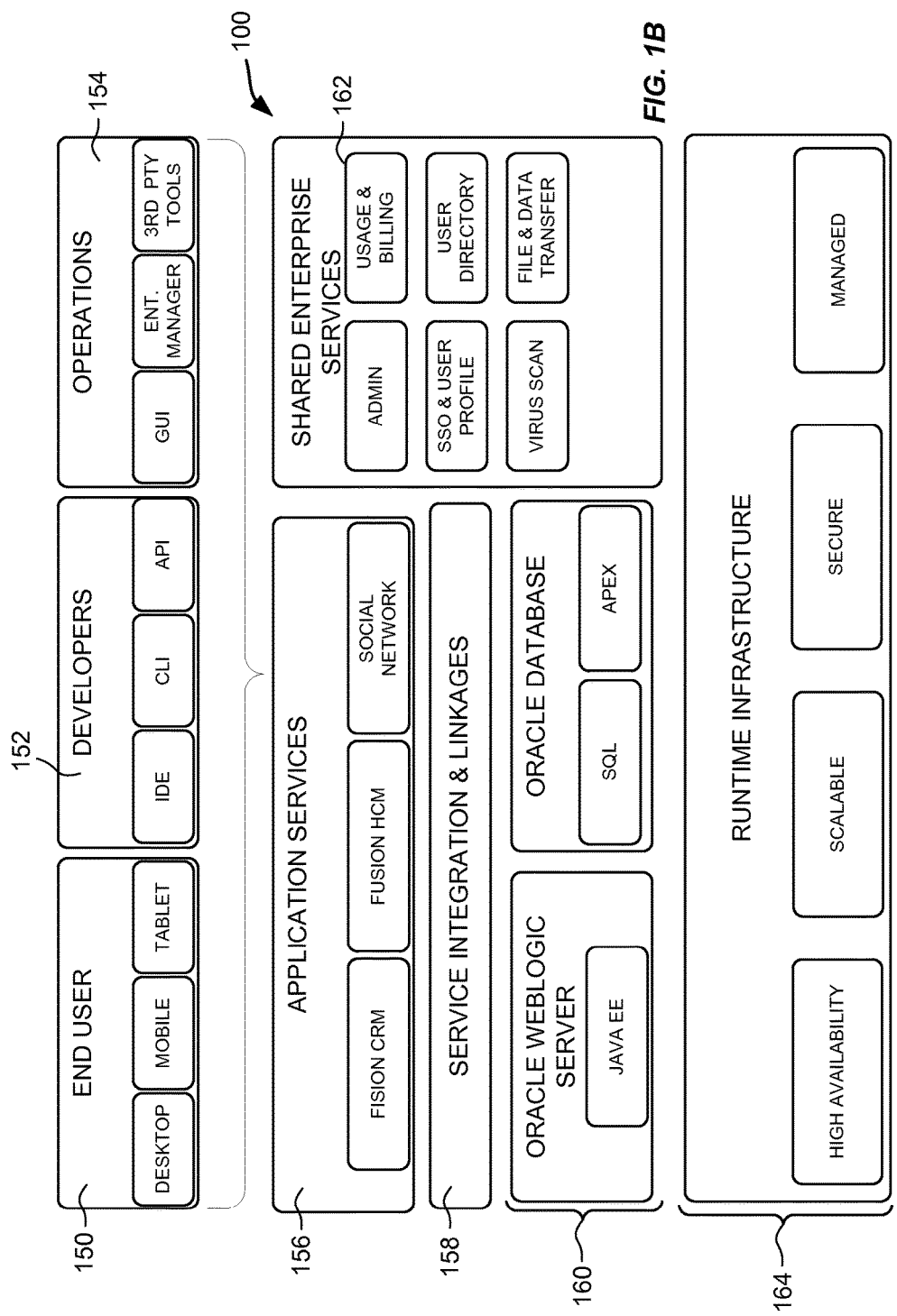
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application-programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software-engineered solution that delivers high-performance, highly available, scalable, secure, and a managed platform for providing cloud services.

Figure 2:
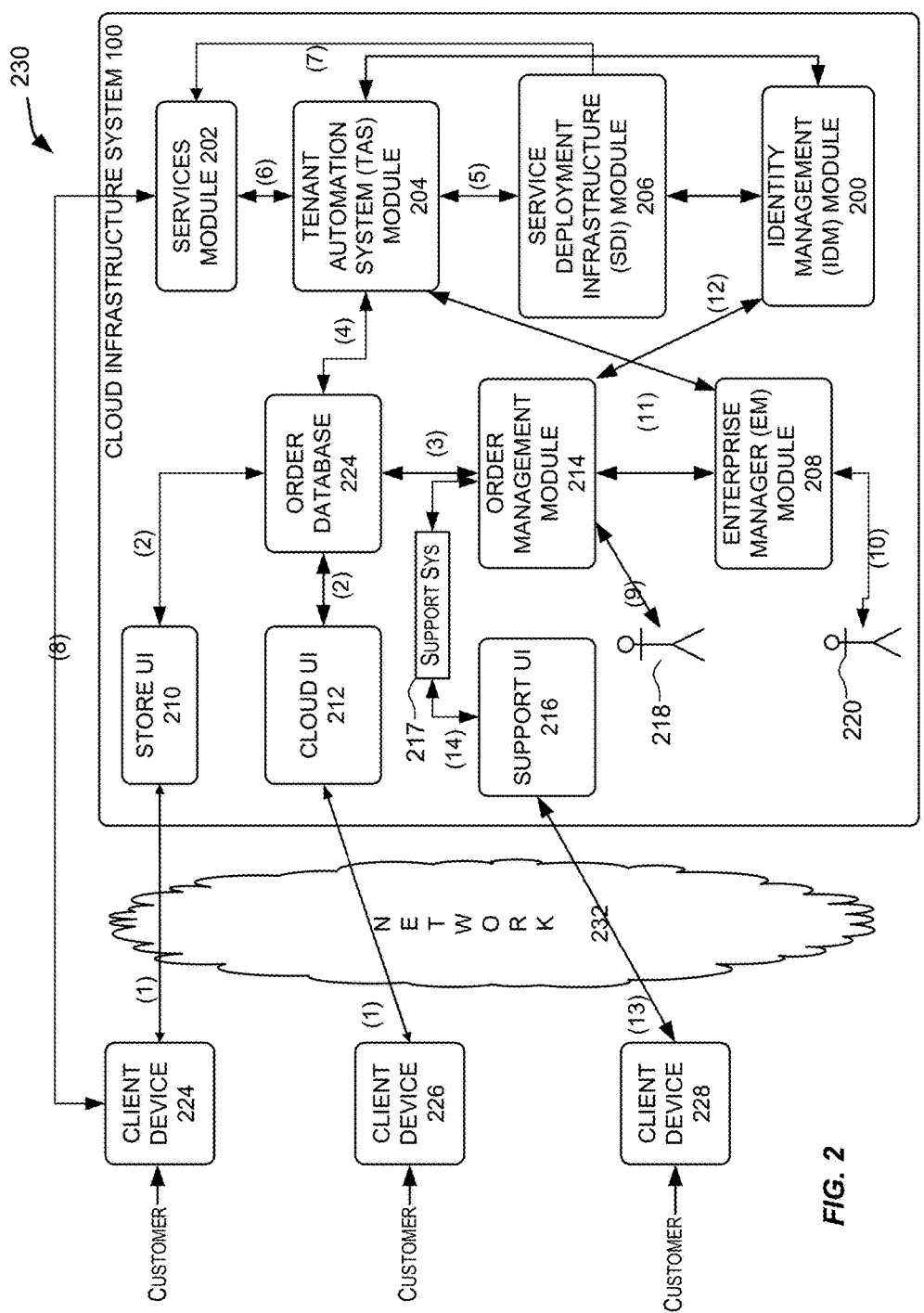
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226, and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 to which the customer intends to subscribe. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level, and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce storefront (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning.

In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. In addition, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
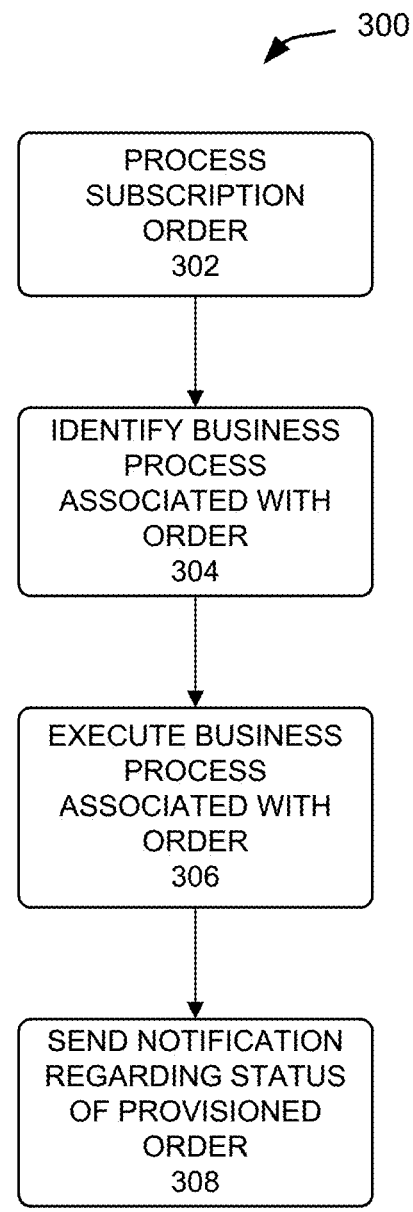
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
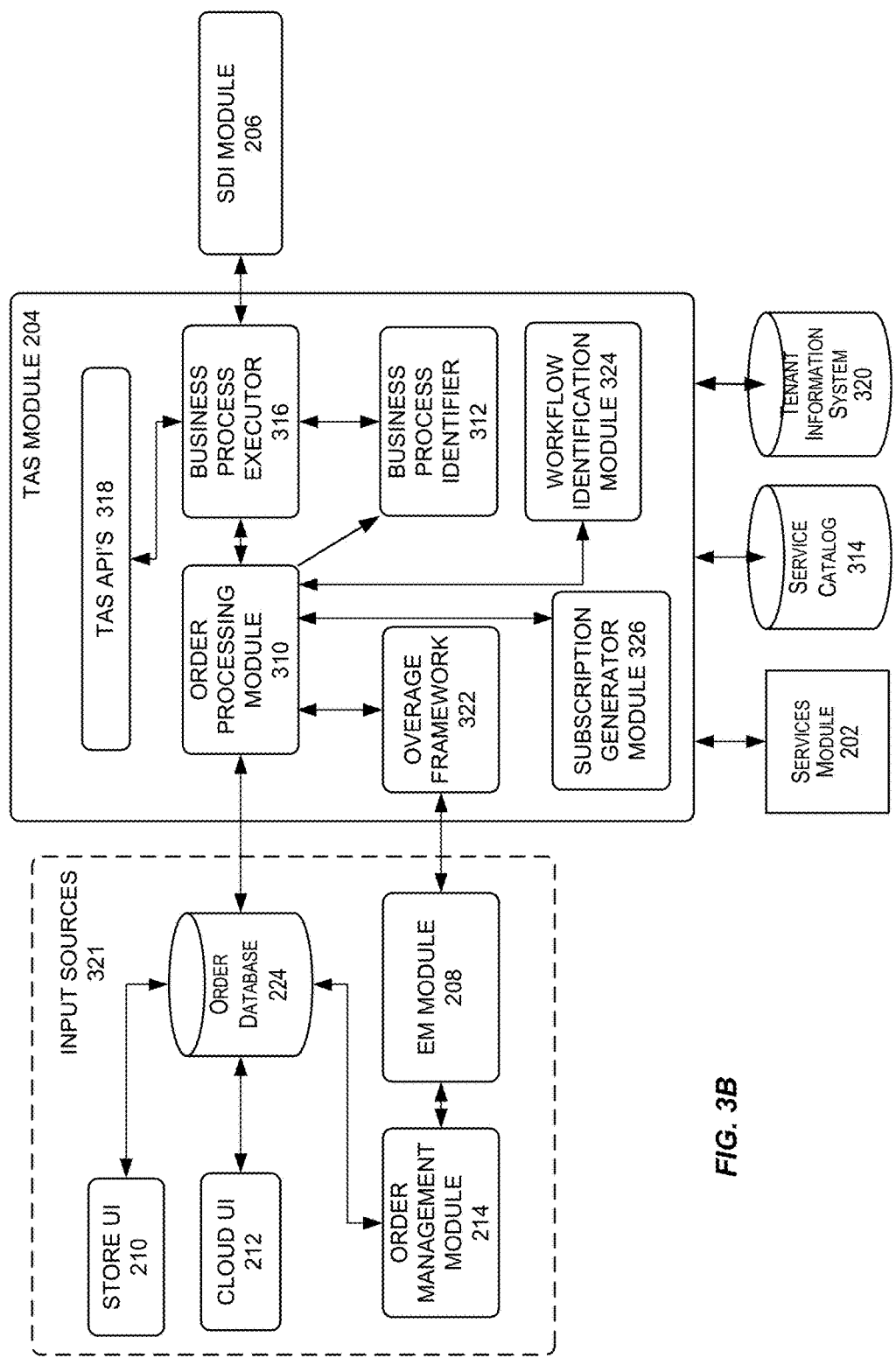
FIG. 3B depicts a simplified high-level diagram of one or more sub-modules in the TAS module in the cloud infrastructure system, in accordance with an embodiment of the present invention.

FIG. 3B depicts a simplified high-level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order-processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order-processing module 310 may directly receive an order via cloud UI 212 or store UI 210, in one embodiment. Alternatively, order-processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order-processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order-processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration-required state when intervention by an administrator is needed to resolve the issue. The order is in an error state when the order cannot be processed. In addition to maintaining the order progress status, order-processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order, or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
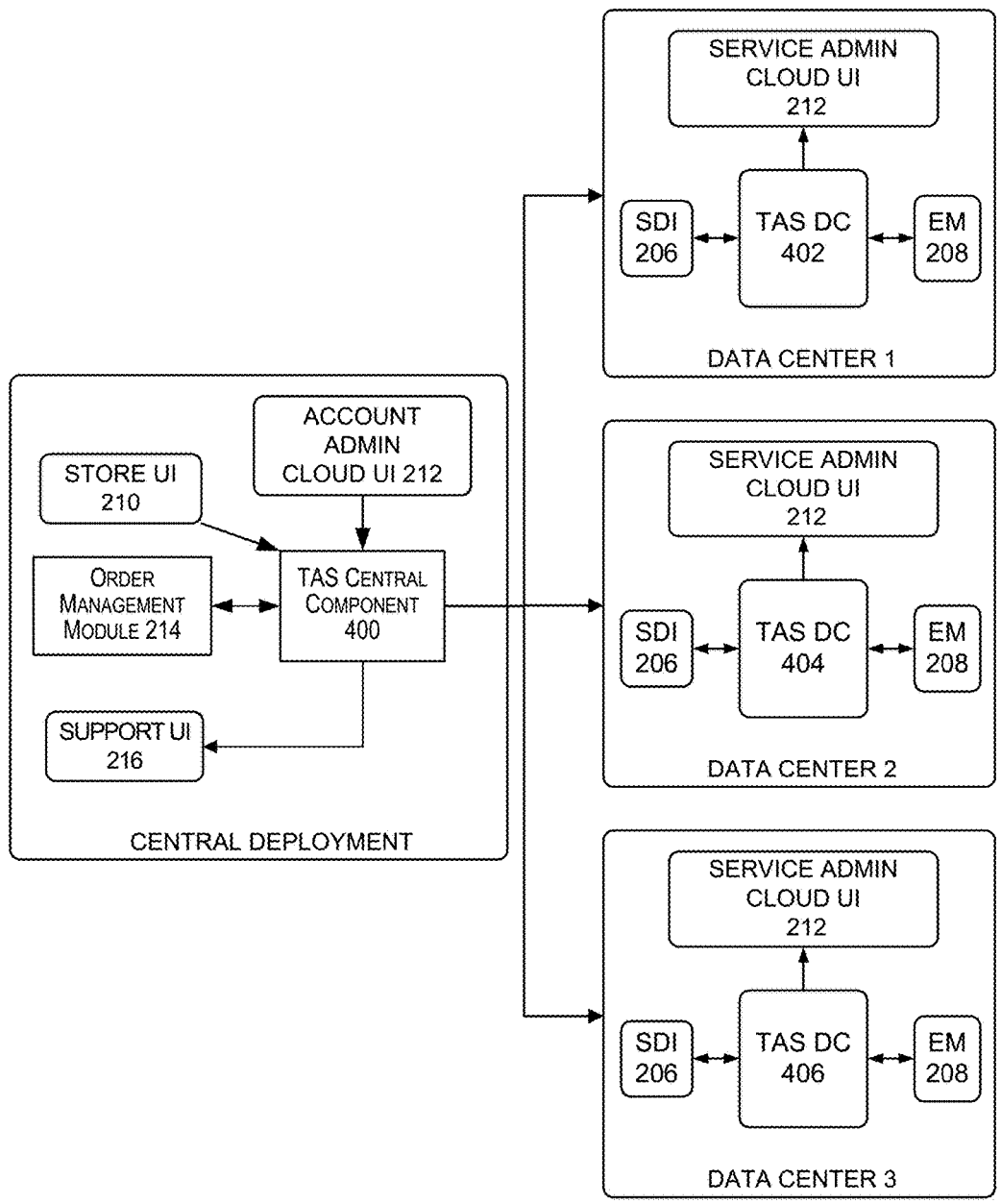
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404, and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212, and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
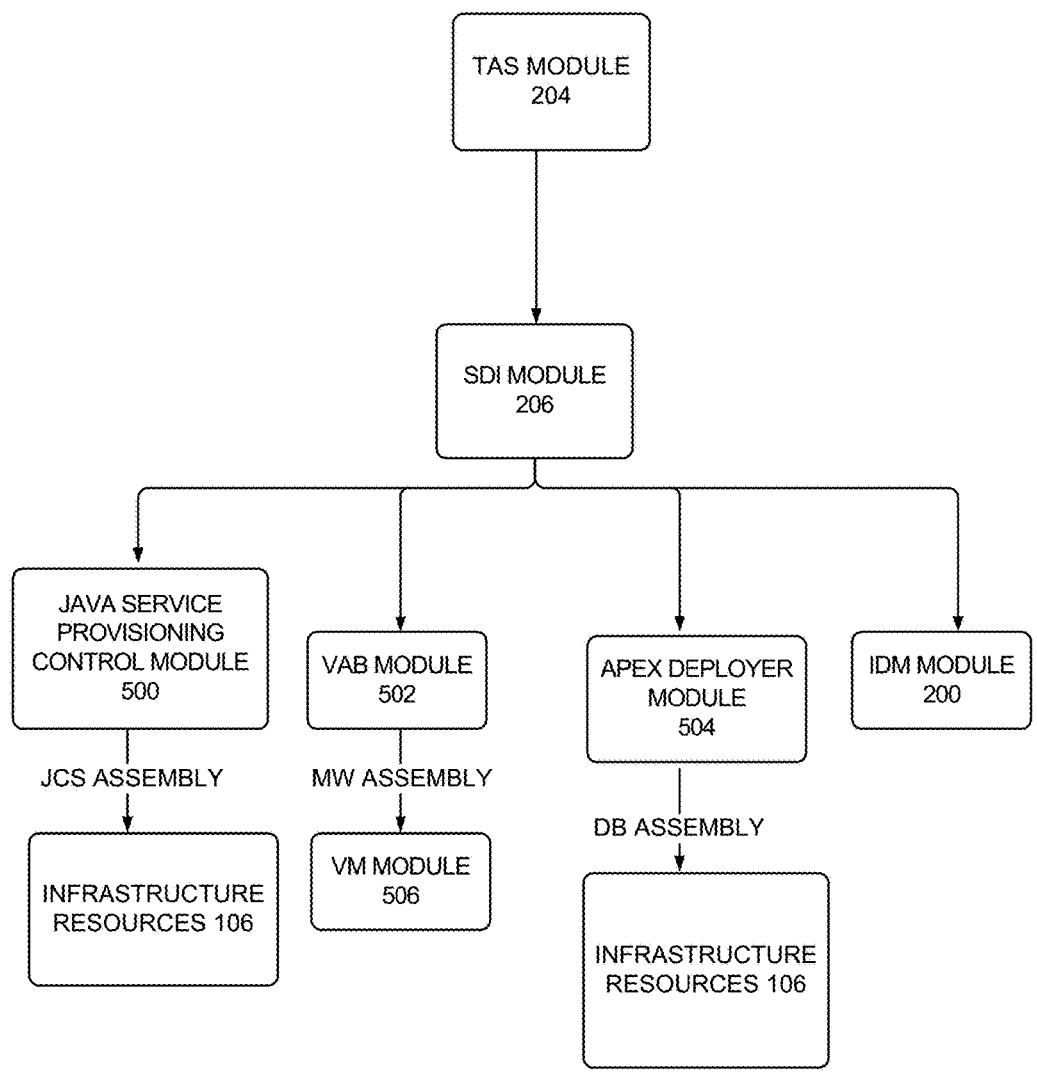
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
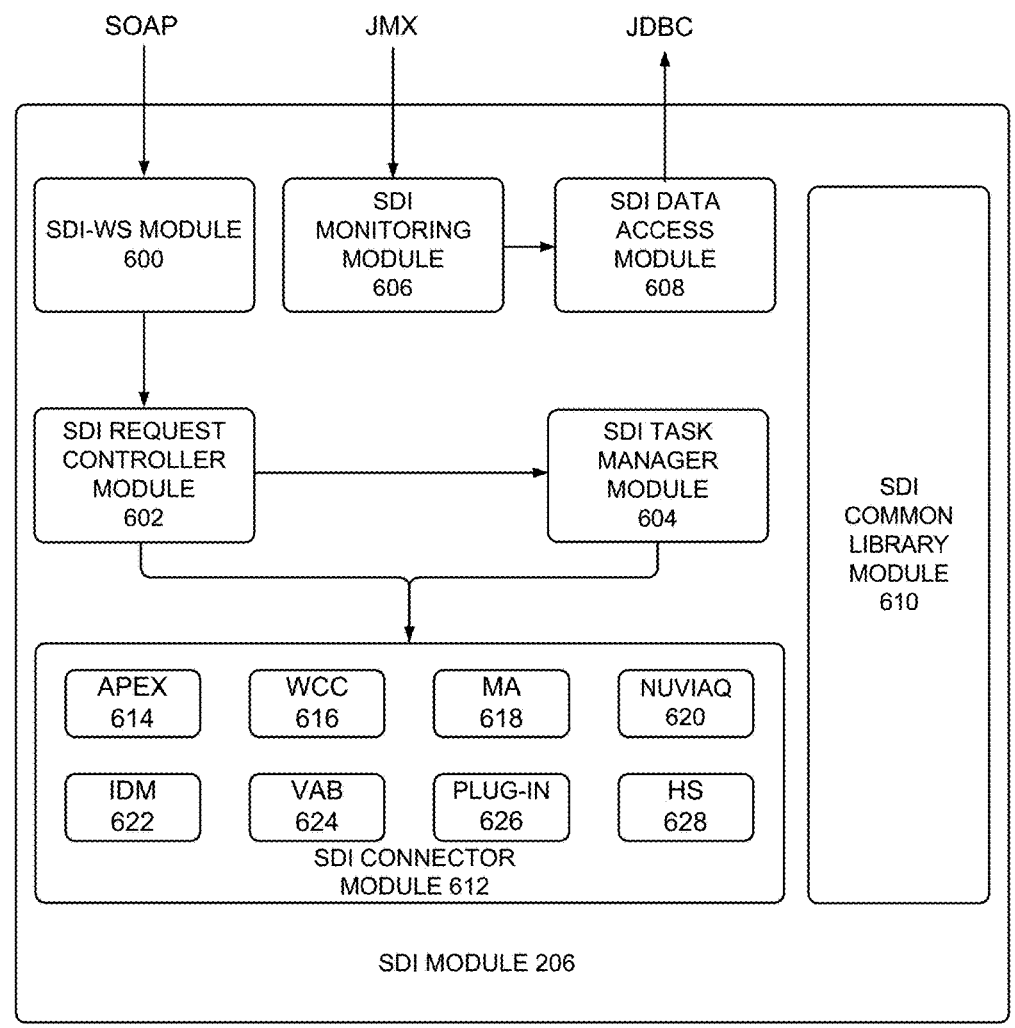
FIG. 6 depicts a simplified high-level diagram of sub-modules of the SDI module according to an embodiment of the present invention.

FIG. 6 depicts a simplified high-level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request-processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects, and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
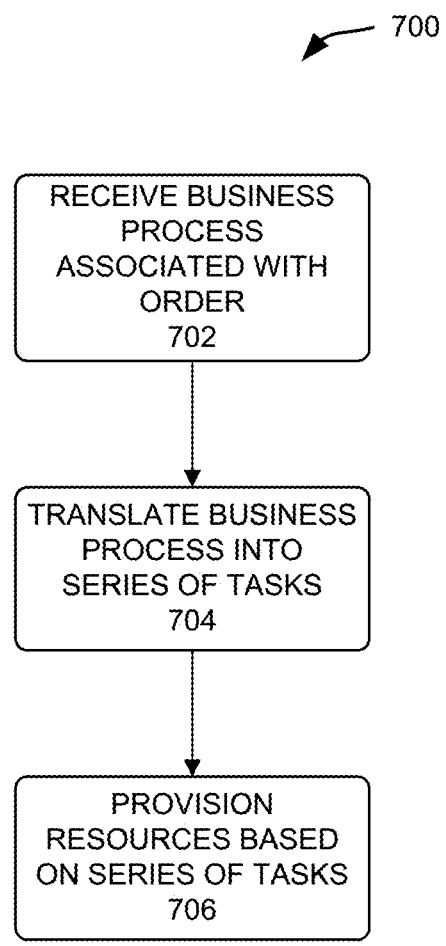
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
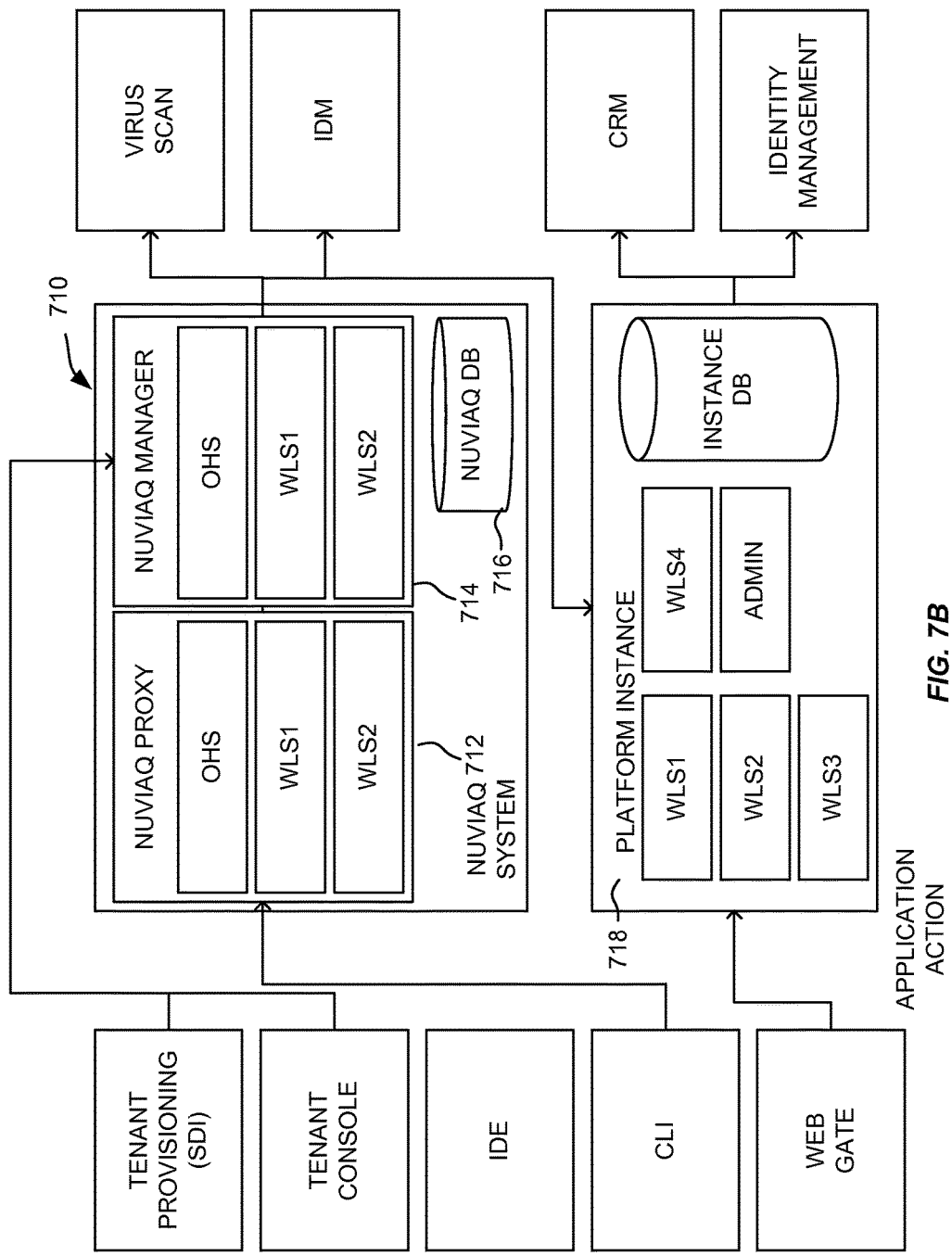
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations, and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property#1: oracle.cloud.service.weblogic.size
    Values: BASIC, STANDARD, ENTERPRISE
    Description: Specifies the subscription type. This impacts the number of servers, database limits and quality of service settings.
Property#2: oracle.cloud.service.weblogic.trial
    Values: TRUE, FALSE
    Description: Indicates whether or not this is a trial subscription.
Property#3: oracle.cloud.service.weblogic.crm
    Values: CRM Service ID
    Description: Identifies a CRM service to be associated with this WebLogic service instance.

Figure 7C:
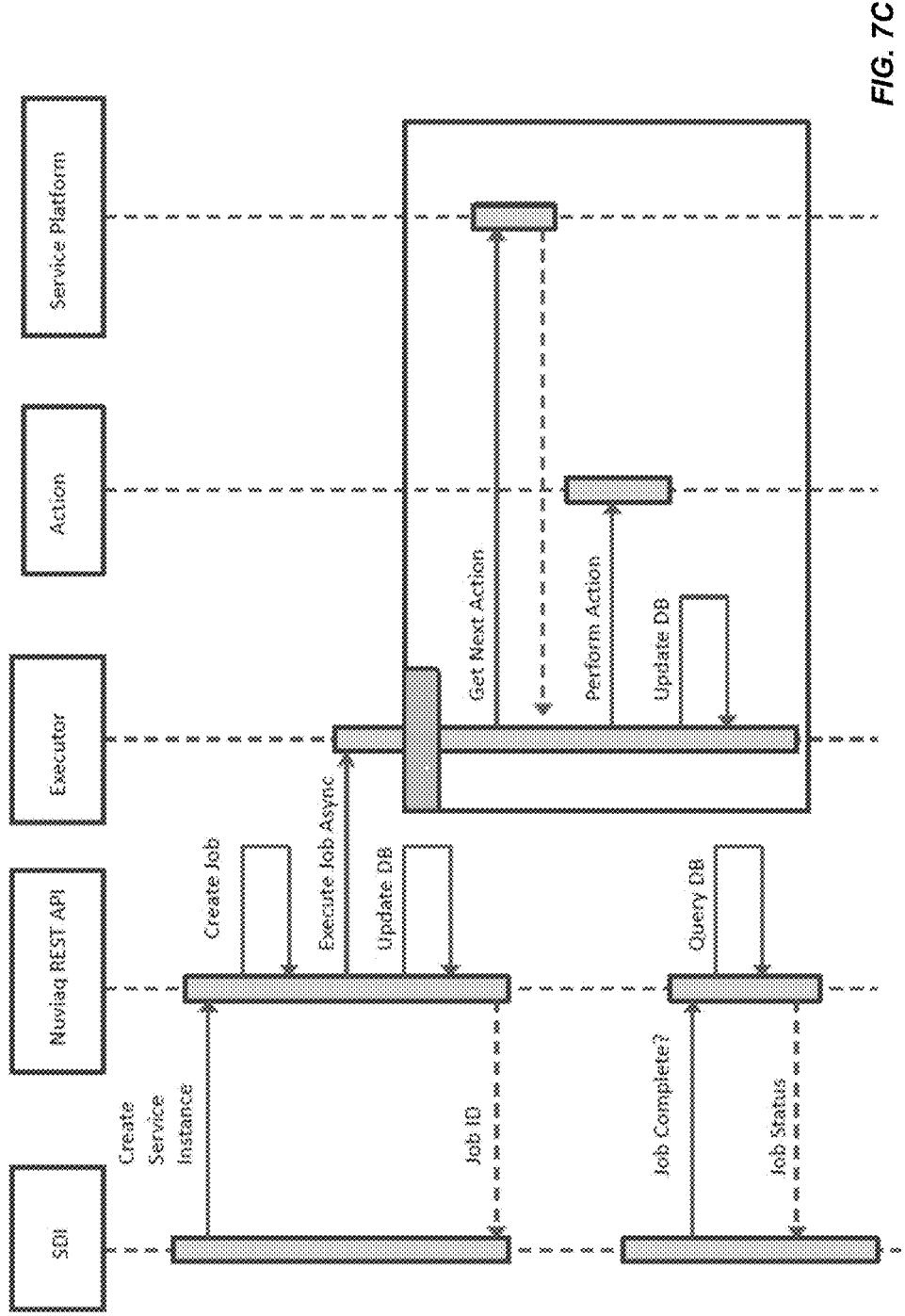
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:

Property: oracle.cloud.service.weblogic.state
Values: RUNNING, STOPPED
Description: Specifies the initial state of the application after deployment.

Figure 7D:
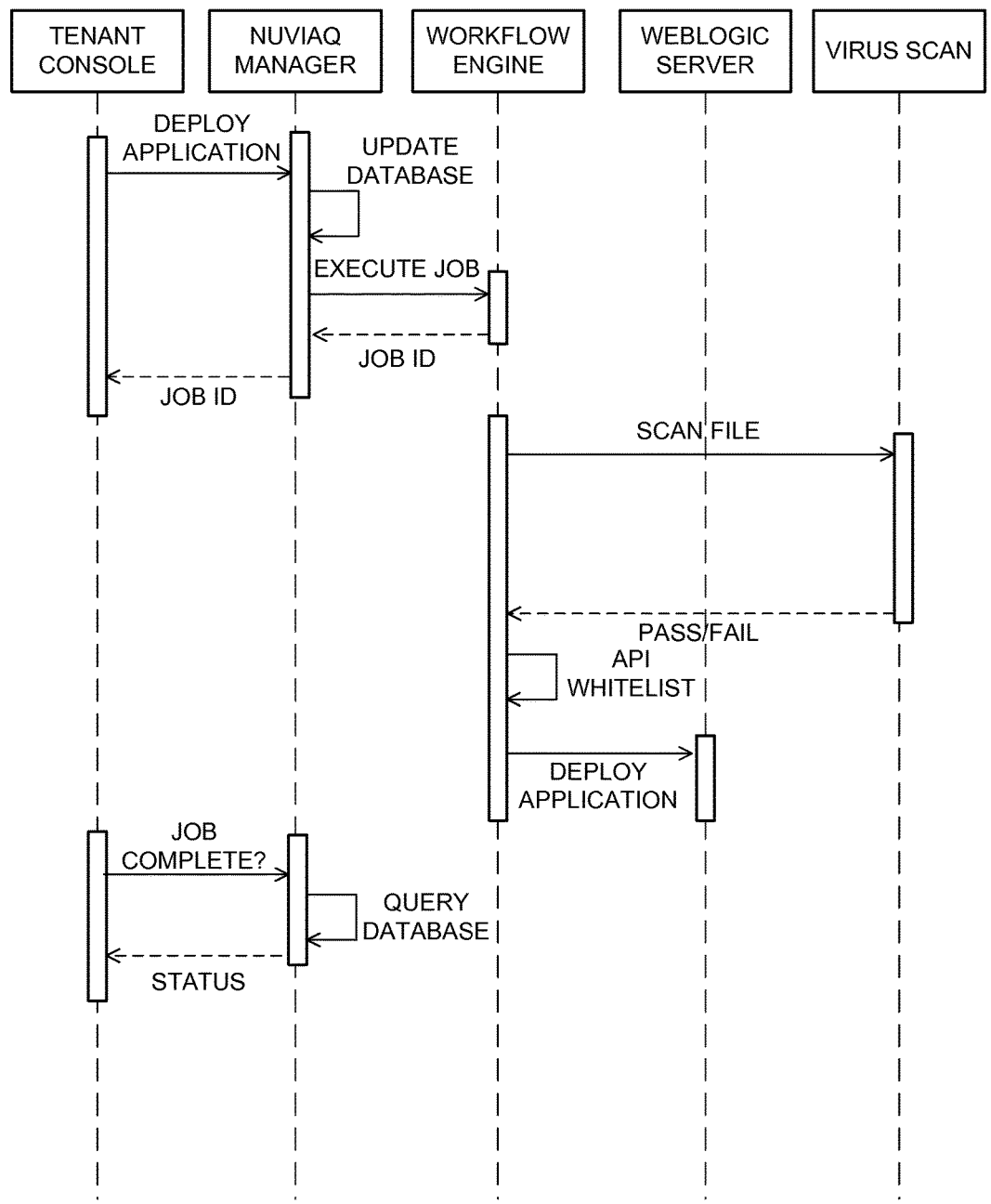
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
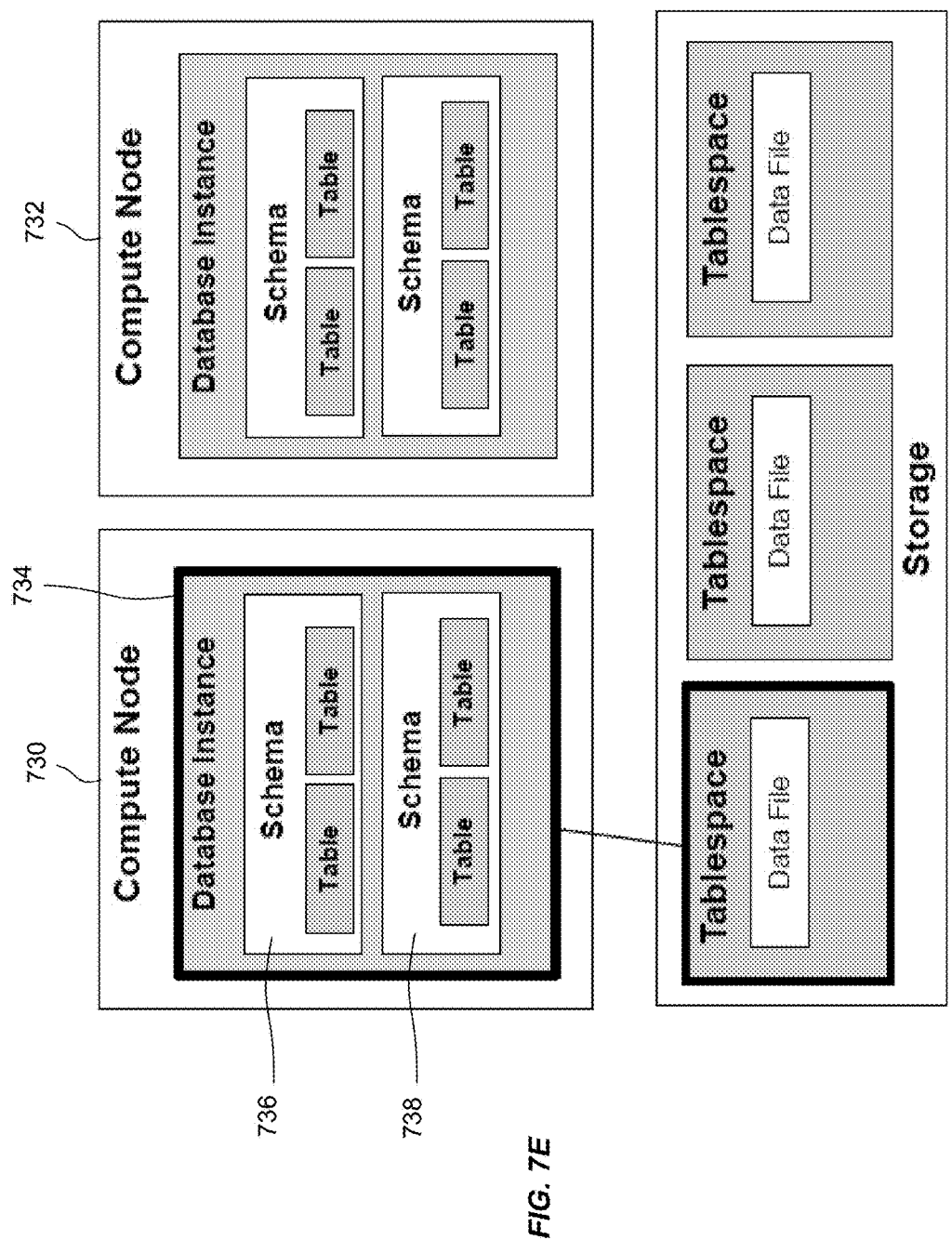
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

Intelligent Data Center Selection

In certain embodiments, cloud infrastructure system 100 enables selection of appropriate data centers to host subscriptions. In the embodiment depicted in FIG. 4, the distributed deployment of TAS module 204 includes TAS central component 400 and one or more TAS DCs 402, 404 and 406 within data centers 1, 2, and 3 respectively. In one aspect, TAS central component 400 receives customer orders and performs order-related business operations such as creating subscriptions.

The efficacy of TAS central component 400 lies in its flexibility and ability to handle a wide variety of inputs. Inputs can be processed through an intelligent workflow using order-related information allowing TAS central component 400 to determine which data center will host the subscriptions. In one aspect, some types of inputs to the workflow include static inputs and dynamic inputs.

Static inputs as used herein generally refer to scriptable custom rules and algorithms provided by a system administrator. These rules use dynamic parameters and result in a list of data centers (DCs). Rules can be assigned a priority and can be executed in priority order. Additionally, the algorithms to be applied to a list of DCs work on a list to output a DC. An algorithm can be applied at two levels—at each rule level, and at a global level.

Dynamic inputs as used herein generally refer to customer order parameters, DC availability metrics, and DC capacity metrics. Customer order parameters can include customer name and other attributes, service type being ordered, and other service attributes, etc. DC availability metrics and levels can include the available capacity for each service type in a DC, and can be used to filter a list of DCs. DC capacity metrics and levels cans include the total capacity for each service type in a DC, and can be used to filter a list of DCs.

In various embodiments, the responsibilities of TAS central component 400 may also include maintaining metrics needed by cloud infrastructure system 100 to make appropriate selections between data centers. Based on metrics about each data center, TAS central component 400 can determine which data center will host the subscriptions. The responsibilities of TAS central component 400 may also include maintaining additional requirements needed by cloud infrastructure system 100 to make appropriate selections between data centers. Based on these additional requirements, such as local laws or regulations, TAS central component 400 can determine which data center will host the subscriptions.

Figure 8:
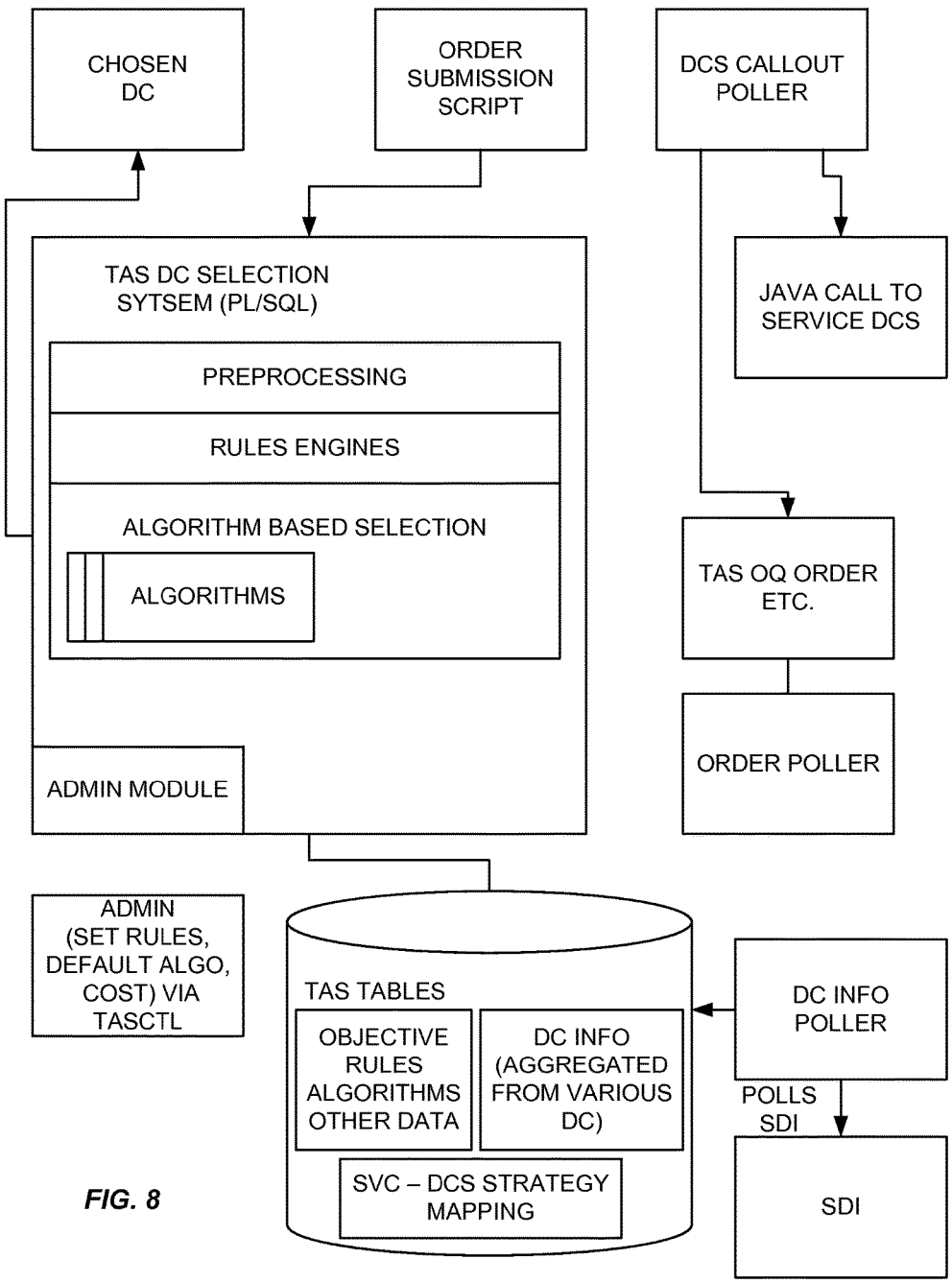
FIG. 8 illustrates a high level overview of the various interactions involved to provide intelligent data center selection in accordance with an embodiment of the present invention.

FIG. 8 illustrates a high level overview of the various interactions involved to provide intelligent data center selection in accordance with an embodiment of the present invention. According to this embodiment, the distributed TAS system shown in FIG. 4, TAS central component 400 includes a TAS DC Selection System that initially receives an order made by a customer via cloud UI 212, store UI 210, via order management system 214, or via order database 224. In this example, TAS DC Selection System receives order information from an order submission script. The customer may be ordering one or more subscriptions. The order information can include information identifying the customer, the type of services that the customer wishes to subscribe to, user information, and any other information relevant to the customer and subscription. Based on the order information, the TAS DC Selection System can identify one or more regions of the world (such as Americas, EMEA, or Asia Pacific) from which the order originates or to which region a subscription may be designated.

The TAS DC Selection System can then select a Chosen DC for the order using a preprocessing layer, a rules engine, an algorithm-based selection layer, and TAS Tables to determine the Chosen DC (e.g., which particular TAS DCs (for e.g., 402, 404 or 406) will be employed for provisioning the order). In various embodiments, the TAS DC Selection System retrieves objectives, rules, algorithms, and other data from the TAS Tables. An administrator can define the objectives, create rules, and specify selection algorithms using an Admin module of the TAS DC Selection System.

In some embodiments, the TAS DC Selection System retrieves data center information aggregated from various data centers. A DC Info Poller can connect to each of the data centers (e.g., to SDI 206 of each data center) to obtain information about the operation of the data center, services offered, subscriptions hosted, resource allocations, resource availability, as well as other information related the data center. In some embodiments, the TAS DC Selection System can retrieve service to data center strategy mappings from the TAS Tables.

Based on information retrieved from the TAS Tables and the order information received from the Order submission script, the TAS DC Selection System utilizes the preprocessing layer, the rules engine, and the algorithm-based selection layer to select the Chosen DC. The TAS DC Selection System can then send an order request to the Chosen DC in which to provision services for the order request.

In some embodiments, the TAS DC Selection System receives the order information from an Order Poller. For services that are provisioned but have a custom DCS mechanism, the Order Poller can identify orders where a data center is not set. The Order Poller can call an appropriate API and get the Chosen DC from the TAS DC Selection System.

Figure 9A:
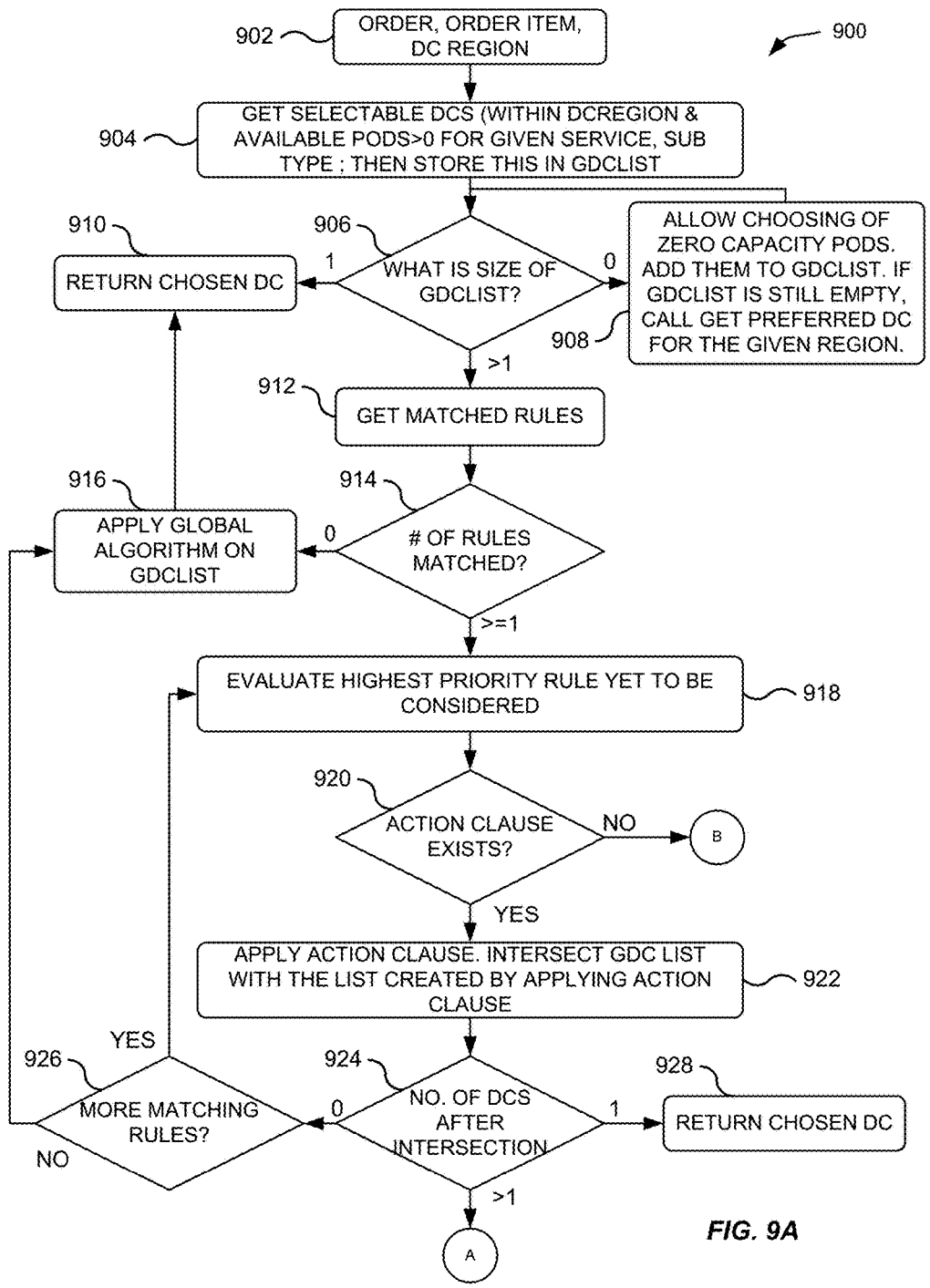
FIGS. 9A-9B are a flowchart of a method for selecting a data center to host a cloud subscription according to various embodiments.
Figure 9B:
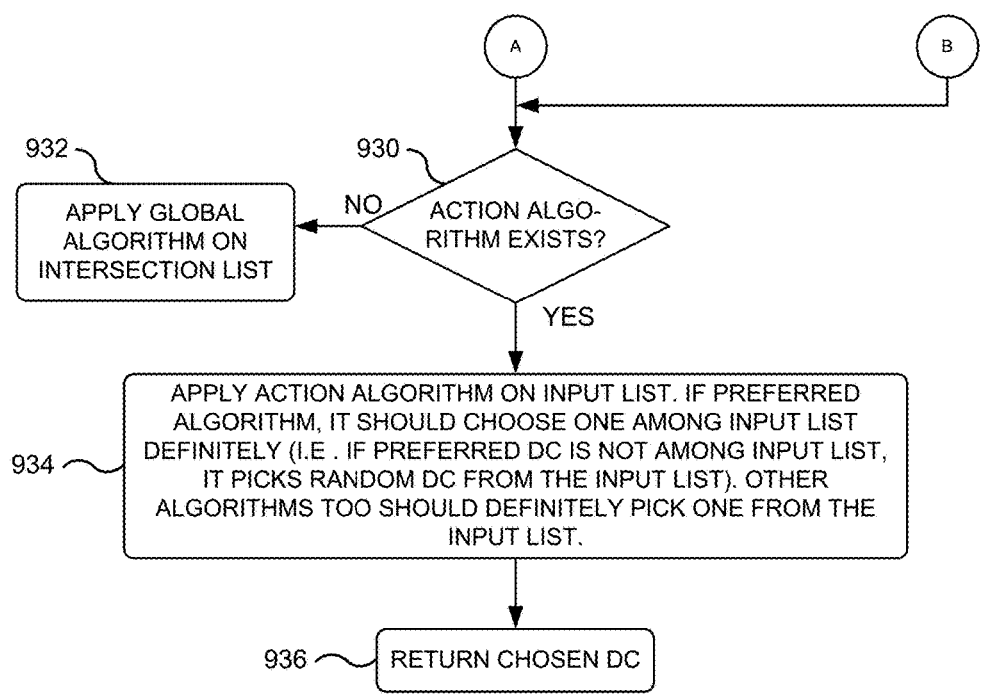

FIGS. 9A-9B are a flowchart of method 900 for selecting a data center to host a cloud subscription according to various embodiments. The processing depicted in FIGS. 9A-9B may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIGS. 9A-9B is not intended to be limiting. Other sequences of steps may also be performed according to alternative embodiments. For example, alternative embodiments of the present invention may perform the steps outlined above in a different order. Moreover, the individual steps illustrated in FIGS. 9A-9B may include multiple sub-steps that may be performed in various sequences as appropriate to the individual step. Furthermore, additional steps may be added or removed depending on the particular applications. One of ordinary skill in the art would recognize many variations, modifications, and alternatives. FIG. 9A begins in step 902.

In step 902, order information is received. For example, the TAS DC Selection System of FIG. 8 can receive an order, order item, and DC region. In step 904, a list of selectable DCs is obtained, for example, within DCRegion & available pods>0 for given service, sub type; then stored in a GDCList (global data center list).

In step 906, a determination is made as to the size of the GDCList. If the size of the GDCList is 0, in step 908, a choice among zero capacity pods is made. The data centers having zero capacity pods are added to the GDCList. Additionally, if GDCList is still empty, the preferred DC for the given region is added to the GDCList. Processing then returns to step 906. If the size of the GDCList is 1, in step 910, the chose DC is returned allowing TAS DC Selection System to request that the chosen DC host the subscription.

If the size of the GDCList in step 906 is greater than 1, in step 912, a set of matched rules is obtained. As indicated above, TAS DC Selection System utilizes a rules engine to process the GDCList according to a set of rules. A rule as used in embodiments of the present invention includes a condition clause and one or more action clauses. The condition clause specifies one or more conditions that must be satisfied in order for the rule to match. An action clause defines one or more actions to be taken for a matching rule. The actions are used to filter out DCs from the GDCList. In one embodiment, an action specifically excludes a DC from the GDCList. In one embodiment, an action applies a predetermined algorithm to the GDCList to filter the GDCList.

Each rule in the set of rules can be identified (matched) using properties of the order, customer, DC region, or the like to satisfy the condition clauses. In step 914, a determination is made as to the size of the set of matched rules. If there are no matched rules, in step 916, a global algorithm is used on the GDCList to determine a chosen DC (which is returned in step 910).

If there are one or more rules in the set, a determination is made as to the ordering of processing of the rules in the set. For example, in step 918, the highest priority rule yet to be considered is then evaluated. In step 920, a determination is made whether the rule includes an action clause. If no action clause is present, processing continues in FIG. 9B via reference "B."

If an action clause is present, the action clause is applied in step 922. TAS DC Selection System can intersect the GDCList with a list of DCs created by applying action clause. In step 924, a determination is made as to the number of DCs after the intersection. If there are 0 DCs, a determination is made in step 926 whether there are any more matching rules. If so, processing continues in step 918. If not, processing continues in step 916 where the global selection algorithm is applied for choosing the appropriate DC.

If there is one (1) DC left in the determination is step 924, in step 928, the remaining DC is returned as the chosen DC. If there is more than one DC left in the list, processing continues in FIG. 9B via reference "A."

Referring to FIG. 9B, a determination is made whether an action algorithm exists in step 930. A rule can specify an action algorithm that further filters a list of DCs. If no action algorithm is specified, in step 932, the global algorithm is then applied to determine the appropriate DC. If an action algorithm does exist, in step 934, the action algorithm is applied on input list. In one embodiment, if there is a preferred algorithm, it should choose one among input list definitively (i.e., if preferred DC is not among input list, it picks random DC from the input list). Other algorithms should definitively pick one from the input list. In step 936, the chosen DC is returned from the list.

In some embodiments, an administrator can add data center selection rules at will. The following are a few examples of commands that add data center selection rules and show what the rules can look like.

Rule #1—Always select a particular data center for a particular customer
add_data_center_selection_rule—name us3_for_bmwcustomer—rule_clause "orders.customer_name='bmw'"—action "id='US003'"—status ACTIVE—priority 5

Rule #2—Always select least cost data center for a particular customer (overrides global algorithm)

```
add_data_center_selection_rule --name leastcost_dc_for_bmwcustomer
--rule_clause "orders.customer_name='bmw'" --action_algo "LEAST_
COST"--status ACTIVE --priority 5
```

Rule #3—Always select least cost data center for TRIAL orders

```
add_data_center_selection_rule --name leastcost_dc_fortrial
--rule_clause " order_items.subscription_type='TRIAL'" --action_algo
"LEAST_COST"
```

Rule #4—Not select a particular data center

```
add_data_center_selection_rule --name donot_select_us1_for_trials --rule_
clause " order_items.subscription_type ='TRIAL'" --action "id<>'US001'"
```

Rule #5—Action containing multiple properties

```
add_data_center_selection_rule --name select_below35USdc_for_java
--rule_clause "service_type like 'JAVA'" --action "id like 'US%' and
devops_weight < 35" --status ACTIVE --priority 5
```

Rule #6—Specifying action algorithm for the list of DCs filtered by action

```
add_data_center_selection_rule --name lru_algo_among_sub200dcs_for_
java --rule_clause "service_type_like 'JAVA'" --action "devops_weight
< 200" --action_algo LFU --status ACTIVE --priority 5
```

Figure 10:
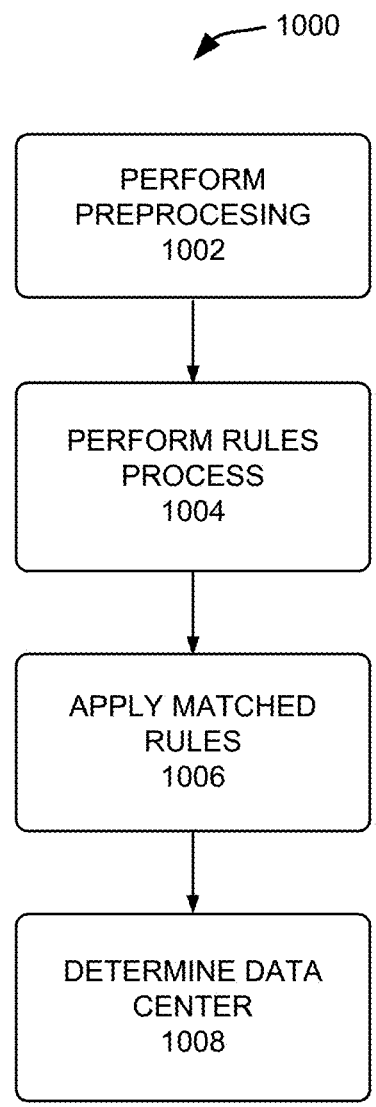
FIG. 10 is a simplified flowchart of a method for selecting a data center to host a cloud subscription according to various embodiments.

FIG. 10 is a flowchart of method 1000 for selecting a data center to host a cloud subscription according to various embodiments. The processing depicted in FIG. 10 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 10 is not intended to be limiting. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives. FIG. 10 begins in step 1002.

In step 1002, preprocessing is performed. In various embodiments, a preprocessing layer of the TAS DC Selection System of FIG. 8 provides flexibility to choose among only 'valid' DCs. Based on a requested service/subscription-type from the order information, the TAS DC Selection System can obtain a list of all the available data centers that can serve any ordered services or service-subscription types. In one aspect, the list of all the available data centers is filtered down using a set of active rules and algorithms to determine at least one appropriate data center.

In step 1004, rules processing is performed. In various aspects, the TAS DC Selection System parses or processes a set of active rules to determine a set of matched rules. A rule may be assigned a priority and the TAS DC Selection System may apply matched rules based on their assigned priority. Each rule can define criteria that need to be satisfied in order for the rule to be considered a match. Criteria that may be used to match a rule can include criteria related to the order information, criteria related to each data center, criteria related to cloud infrastructure system 100, or the like.

A rule can also define, reference, or otherwise indicate an action, algorithm, logic, or combinations thereof. In one aspect, a rule action defines, refers to, or otherwise identifies a set of one or more operations, instructions, logic, steps, or the like to be performed or applied to the list of all the available data centers determine in the preprocessing of step 1002 to filter out data centers and otherwise determine a new list of available data centers. A rule algorithm defines one or more algorithms that based on a set of inputs to be performed or implemented to filter out data centers and otherwise determine a new list of available data centers. In some embodiments, a rule defines only a rule action. A default algorithm or universal selection mechanism is applied to the new set of data centers resulting from application of the rule action.

In step 1006, the set of matched rules are applied. For example, when a rule action is defined, TAS DC Selection System computes an appropriate data center or list of appropriate data centers from the action. When a rule algorithm is defined, TAS DC Selection System selects that specific algorithm for computing an appropriate data center or list of appropriate data centers. If no data centers are available for selection or if no data centers are obtained as a result of applying the set of matched rules, TAS DC Selection System can select a default data center for the service.

In various embodiments, if a matched rule when applied resulted in a list of data centers, a default algorithm for determining an appropriate data center is run against that list of data centers. If an algorithm is defined by or otherwise chosen by a matched rule when applied, that algorithm is run instead of any default selection algorithms. In some embodiments, a rule specifies or otherwise indicates only a rule algorithm. Application of the rule causes TAS DC Selection System to apply the provided rule algorithm to obtain a new set of data centers and select from among the data centers in the new set of data centers. In further embodiments, a rule may define both a rule action and a rule algorithm. Application of the rule causes TAS DC Selection System to apply the provided rule algorithm to a new set of data centers resulting from application of the rule action.

In step 1008, a data center is determined. In various embodiments, TAS DC Selection System begins with a list of data centers that may be appropriate to host the subscription and filters down the list to select an appropriate data center to identify one data center or at least a smaller subset of data centers in the list. FIG. 10 ends in step 1008.

CONCLUSION

Figure 11:
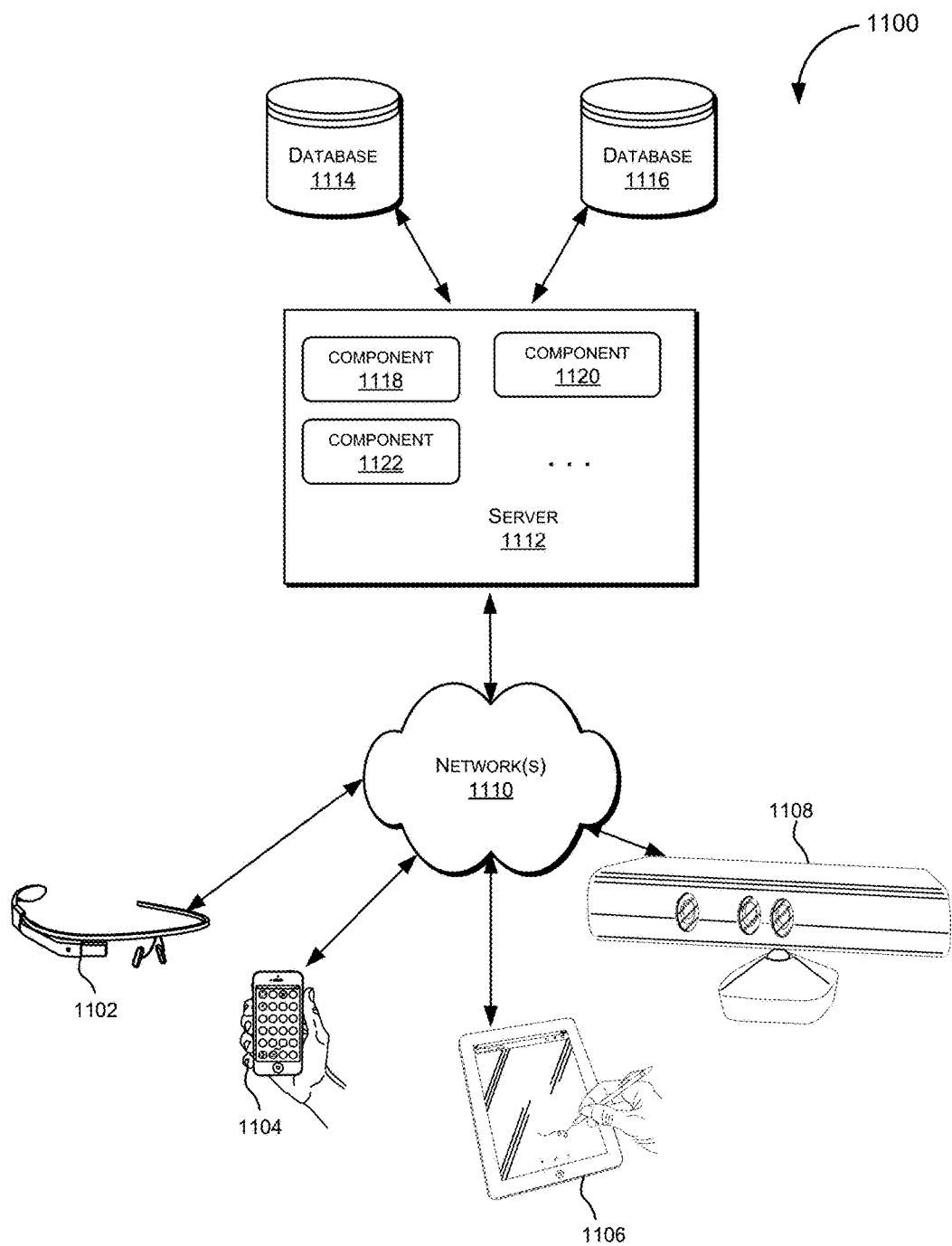
FIG. 11 depicts a simplified diagram of a distributed system for implementing one of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
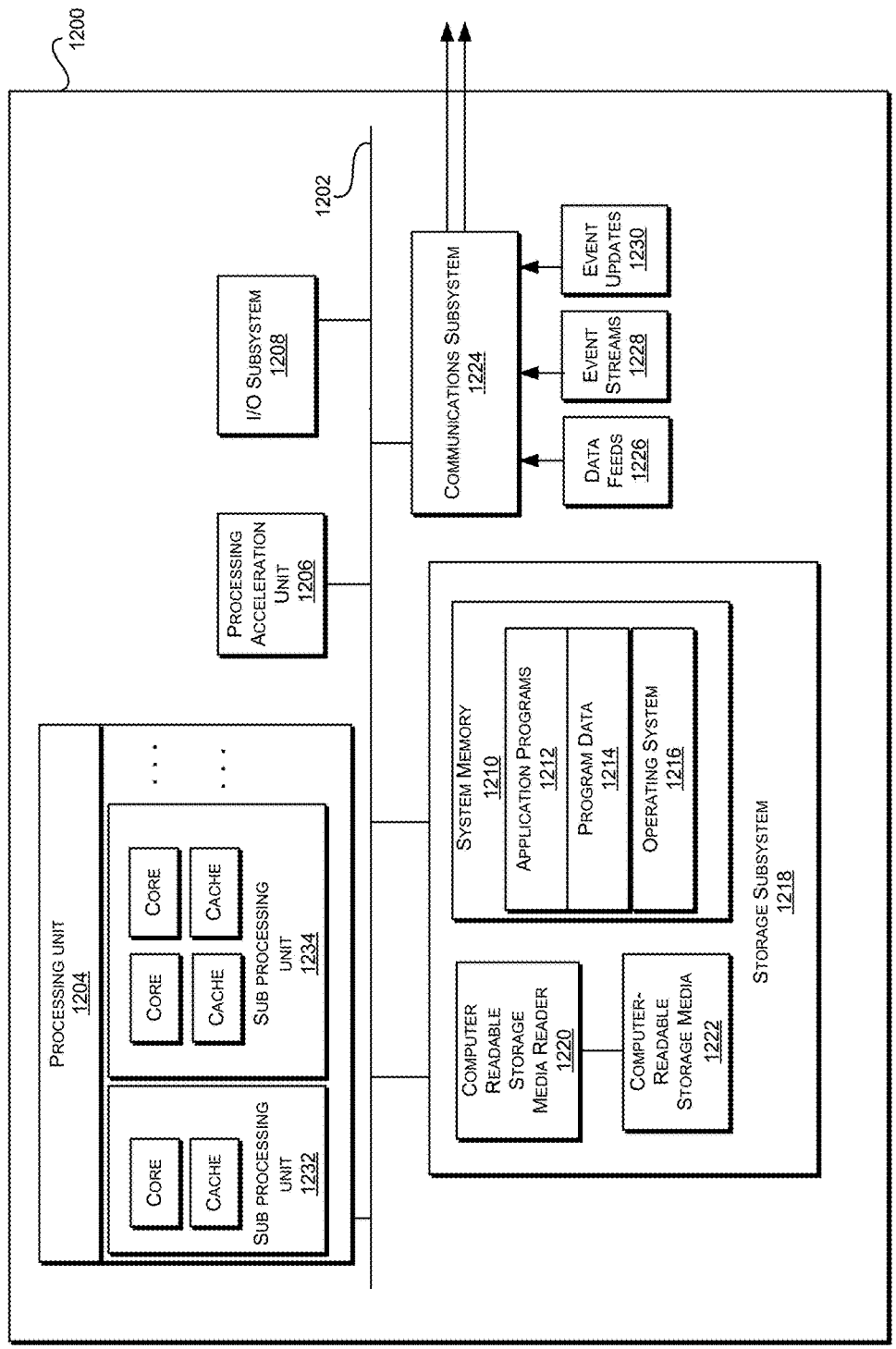
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218, and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

That which is claimed is:

1. A method performed by a computer having a processor and a memory storing a set of data center selection rules, the method comprising:
    receiving, at the computer, order information from an order management server of a cloud computing system, the order information specifying a customer and a product to be instantiated at at least one data center of the cloud computing system;
    determining, by the processor, a set of one or more data center selection rules using the order information; and
    evaluating, by the processor, the set of data center selection rules using a first plurality of data centers associated with the cloud computing system, wherein evaluating the set of data center selection rules comprises:
        determining that a first data center selection rule of the set of data center selection rules includes an action clause defining one or more actions to take with respect to at least one of the first plurality of data centers,
        filtering the first plurality of data centers by applying the action clause to generate a second plurality of data centers,
        determining that the first data center selection rule includes an algorithm clause, and
        selecting a data center from the second plurality of data centers by applying a selection algorithm identified by the first data center selection rule.

2. The method of claim 1 wherein determining, by the processor, the set of one or more data center selection rules using the order information comprises:
    matching at least one data center selection rule having a condition clause specifying one or more properties of the customer.

3. The method of claim 1 wherein determining, by the processor, the set of one or more data center selection rules using the order information comprises:
    matching at least one data center selection rule having a condition clause specifying one or more properties of the product.

4. The method of claim 1 wherein filtering the first plurality of data centers by applying the action clause to generate the second plurality of data centers comprises selecting the second plurality of data centers using one or more properties of the second plurality of data centers defined in the first data center selection rule and one or more metrics associated with the second plurality of data centers.

5. The method of claim 1 wherein filtering the first plurality of data centers by applying the action clause to generate the second plurality of data centers comprises excluding at least one data center from the first plurality of data centers using one or more properties of the at least one data center defined in the first data center selection rule and one or more metrics associated with the at least one data center.

6. The method of claim 1 wherein filtering the first plurality of data centers by applying the action clause to generate the second plurality of data centers comprises selecting at least one data center based on a type of service associated with the product.

7. The method of claim 1 wherein filtering the first plurality of data centers by applying the action clause to generate the second plurality of data centers comprises selecting at least one data center based on a cost of instantiating the product at the at least one data center.

8. The method of claim 1 wherein filtering the first plurality of data centers by applying the action clause to generate the second plurality of data centers comprises selecting at least one data center based on a predefined mapping between the customer or the product and the at least one data center.

9. A non-transitory computer-readable medium storing a computer program executable by a computer having a processor and a memory storing a set of data center selection rules, the non-transitory computer-readable medium comprising:

code for receiving order information from an order management server of a cloud computing system, the order information specifying a customer and a product to be instantiated at at least one data center of the cloud computing system;

code for determining a set of one or more data center selection rules using the order information; and code for evaluating the set of data center selection rules using a first plurality of data centers associated with the cloud computing system, wherein the code for evaluating the set of data center selection rules comprises:

code for determining that a first data center selection rule of the set of data center selection rules includes an action clause defining one or more actions to take with respect to at least one of the first plurality of data centers, code for filtering the first plurality of data centers by applying the action clause to generate a second plurality of data centers, code for determining that the first data center selection rule includes an algorithm clause, and code for selecting a data center from the second plurality of data centers by applying a selection algorithm identified by the first data center selection rule.

10. A system comprising:

a hardware processor; and a memory storing a set of instructions which when executed by the hardware processor cause the hardware processor to:

receive order information from an order management server of a cloud computing system, the order information specifying a customer and a product to be instantiated at at least one data center of the cloud computing system;

determine a set of one or more data center selection rules using the order information; and evaluate the set of one or more data center selection rules using a first plurality of data centers associated with the cloud computing system, wherein to evaluate the set of one or more data center selection rules the hardware processor is caused to:

determine that a first data center selection rule of the set of data center selection rules includes an action clause defining one or more actions to take with respect to at least one of the first plurality of data centers, filter the first plurality of data centers by applying the action clause to generate a second plurality of data centers, determine that the first data center selection rule includes an algorithm clause, and select a data center from the second plurality of data centers by applying a selection algorithm identified by the first data center selection rule.

\* \* \* \* \*

UNITED STATES PATENT AND TRADEMARK OFFICE
CERTIFICATE OF CORRECTION

PATENT NO. : 10,164,901 B2  
APPLICATION NO. : 14/833985  
DATED : December 25, 2018  
INVENTOR(S) : Gomatam et al.

Page 1 of 1

It is certified that error appears in the above-identified patent and that said Letters Patent is hereby corrected as shown below:

In the Drawings

On sheet 2 of 19, in FIG. 1B, under Reference Numeral 156, Line 2, delete "FISION" and insert -- FUSION --, therefor.

On sheet 14 of 19, in FIG. 8, Line 5, delete "SYTSEM (PL/SQL)" and insert -- SYSTEM (PL/SQL) --, therefor.

On sheet 17 of 19, in FIG. 10, under Reference Numeral 1002, Line 2, delete "PREPROCESING" and insert -- PREPROCESSING --, therefor.

Signed and Sealed this  
Twenty-first Day of January, 2020

Andrei Iancu  
*Director of the United States Patent and Trademark Office*